United States Patent
Ivanov et al.

(10) Patent No.: US 11,708,162 B2
(45) Date of Patent: Jul. 25, 2023

(54) AIRCRAFT SEAT MODULE

(71) Applicant: RECARO Aircraft Seating GmbH & Co. KG, Schwaebisch Hall (DE)

(72) Inventors: Pavel Ivanov, Ellhofen (DE); Andreas Ohm, Kupferzell (DE); Felix Maier, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 17/762,932

(22) PCT Filed: Sep. 30, 2020

(86) PCT No.: PCT/EP2020/077356
§ 371 (c)(1),
(2) Date: Mar. 23, 2022

(87) PCT Pub. No.: WO2021/064014
PCT Pub. Date: Apr. 8, 2021

(65) Prior Publication Data
US 2022/0388665 A1    Dec. 8, 2022

(30) Foreign Application Priority Data

Sep. 30, 2019  (DE) .................... 10 2019 126 404.9
Feb. 20, 2020  (DE) .................... 10 1020 104 480.1

(51) Int. Cl.
*B64D 11/06*    (2006.01)
*F16C 29/04*    (2006.01)

(52) U.S. Cl.
CPC ...... *B64D 11/0602* (2014.12); *B64D 11/0606* (2014.12); *F16C 29/045* (2013.01); *F16C 2326/43* (2013.01)

(58) Field of Classification Search
CPC ............ B64D 11/0602; B64D 11/0606; F16C 29/045; F16C 2326/43
See application file for complete search history.

(56) References Cited

U.S. PATENT DOCUMENTS 10,165,858 B1 *  1/2019  Chen ................... A47B 88/487
2016/0298370 A1 * 10/2016  Druckman ............ B64C 1/1438
(Continued)

FOREIGN PATENT DOCUMENTS

GB          2548901 A      10/2017
WO      2018/093825 A1      5/2018
(Continued)

OTHER PUBLICATIONS

German Search Report dated Sep. 1, 2020 in corresponding DE patent application No. 10 2020 104 180.1 (and English translation).
(Continued)

*Primary Examiner* — Rodney A Bonnette
(74) *Attorney, Agent, or Firm* — Posz Law Group, PLC

(57) ABSTRACT

An aircraft seat module includes an enclosure unit which delimits a flight passenger seating region at least partially, and includes a door unit which at least closes a passage region to the flight passenger seating region in one or more operation states. The aircraft seat module further includes a bearing device which supports the door unit movably relative to the enclosure unit and has for this purpose a bearing module having a first bearing element and a second bearing element which are supported such that they are movable relative to each other.

20 Claims, 13 Drawing Sheets

(56) References Cited

U.S. PATENT DOCUMENTS

Figure 1:
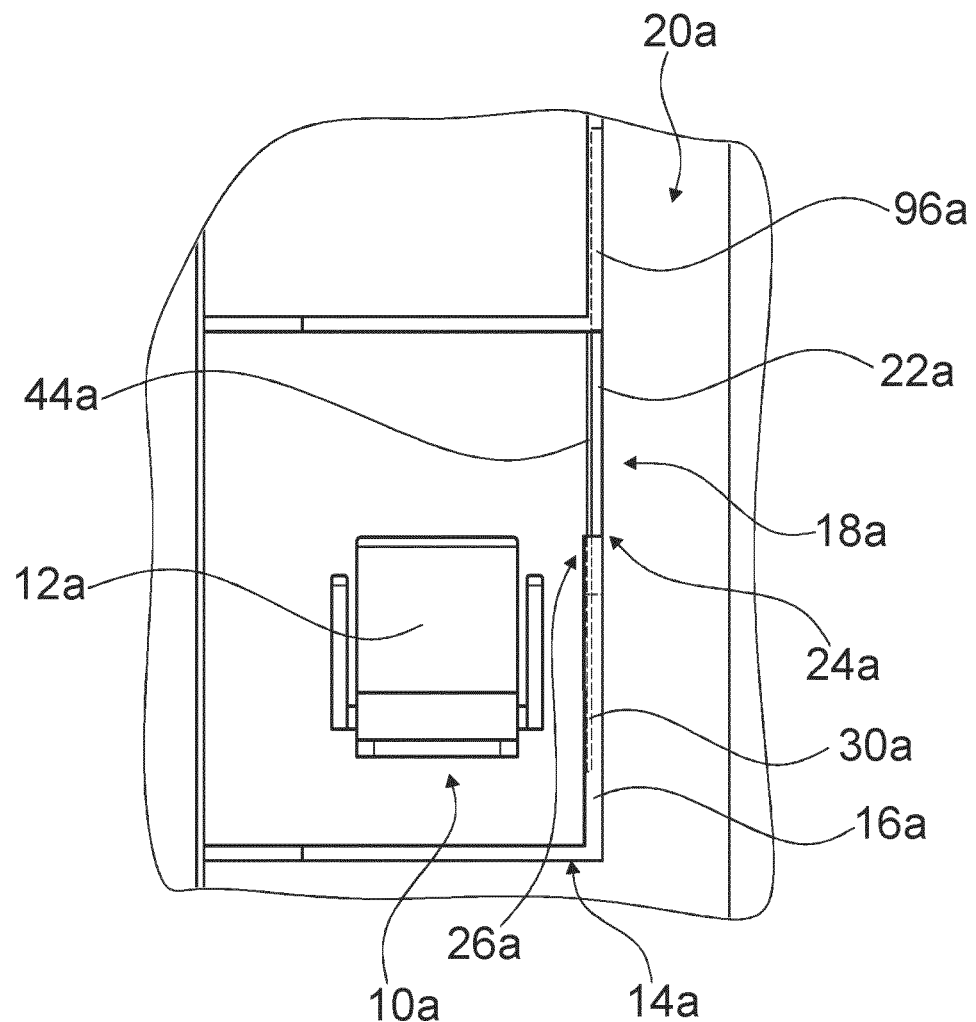

| | | | |
|---|---|---|---|
| 2017/0135482 A1* | 5/2017 | Chen | A47B 88/493 |
| 2018/0281963 A1 | 10/2018 | Dowty et al. | |
| 2020/0122838 A1 | 4/2020 | Bonnefoy et al. | |
| 2020/0245766 A1* | 8/2020 | Rechberg | F16C 29/046 |
| 2021/0171202 A1 | 6/2021 | Bonnefoy et al. | |
| 2022/0063809 A1 | 3/2022 | Thomas et al. | |

FOREIGN PATENT DOCUMENTS

| | | |
|---|---|---|
| WO | 2018/184778 A1 | 10/2018 |
| WO | 2020/126696 A1 | 6/2020 |

OTHER PUBLICATIONS

International Search Report of the International Searching Authority dated Dec. 10, 2020 issued in corresponding International Patent Application No. PCT/EP2020/077356.

International Preliminary Report on Patentability dated Dec. 14, 2021 issued in corresponding International Patent Application No. PCT/EP2020/077356 (and German version of Jul. 30, 2021).

* cited by examiner

AIRCRAFT SEAT MODULE

CROSS REFERENCE TO RELATED APPLICATIONS

This application is based on and incorporates herein by reference German Patent Application DE 10 2019 126 404.9 filed on Sep. 30, 2019 and German Patent Application DE 10 2020 104 480.1 filed on Feb. 20, 2020 as well as PCT application PCT/EP2020/077356 filed on Sep. 30, 2020.

PRIOR ART

The invention concerns an aircraft seat module according to the preamble of patent claim 1.

An aircraft seat module with an enclosure unit which delimits a flight passenger seating region at least partially, and with a door unit which is at least configured to close a passage region to the flight passenger seating region in at least one operation state, and with a bearing device which is configured to support the door unit movably relative to the enclosure unit and has for this purpose a bearing module comprising a first bearing element and a second bearing element which are supported such that they are movable relative to each other, has already been proposed.

From the document WO 2018/093825 A1 an aircraft seat module is already known, with an enclosure unit which delimits a flight passenger seating region at least partially, and with a door unit which is at least configured to close a passage region to the flight passenger seating region in at least one operation state, and with a bearing device which is configured to support the door unit movably relative to the enclosure unit and has for this purpose a bearing module comprising a first bearing element and a second bearing element which are supported such that they are movable relative to each other.

Form the document WO 2018/184778 A1 an aircraft seat module is already known, with an enclosure unit which delimits a flight passenger seating region at least partially, and with a door unit which is at least configured to close a passage region to the flight passenger seating region at least partially, and with a bearing device which is configured to support the door unit relative to the enclosure unit and has for this purpose a bearing module comprising a first bearing element and a second bearing element which are supported such that they are movable relative to each other.

The objective of the invention is in particular to provide a generic device with improved characteristics in terms of safety. The objective is achieved according to the invention by the features of patent claim 1 while advantageous implementations and further developments of the invention may be gathered from the subclaims.

Advantages of the Invention

The invention is based on an aircraft seat module with an enclosure unit which delimits a flight passenger seating region at least partially, and with a door unit which is at least configured to close a passage region to the flight passenger seating region in at least one operation state, and with a bearing device which is configured to support the door unit movably relative to the enclosure unit and has for this purpose a bearing module comprising a first bearing element and a second bearing element which are supported such that they are movable relative to each other.

It is proposed that the bearing module comprises a third bearing element which is configured, in an operation state that differs from a normal operation state, to support the second bearing element movably. By an "aircraft seat module" is in particular a module to be understood which defines a flight passenger seating region and for this purpose comprises at least one enclosure element separating the flight passenger seating region at least partially from a remaining cabin region, at least one aircraft seat that is arranged in the flight passenger seating region and further elements of the flight passenger seating region, like in particular a console, an ottoman and/or a screen unit. The aircraft seat is herein preferably embodied as a single seat. By a "flight passenger seating region" is in particular a region to be understood in which at least one aircraft seat, preferably an aircraft seat embodied as a single seat, or a seat unit formed of at least two aircraft seats is arranged, and which is intended to accommodate at least one passenger during a flight in an aircraft. Preferably further elements are arranged in a seat region which can be used by a passenger, like in particular a console, an ottoman, stowage facilities, deposition elements and/or entertainment devices. The flight passenger seating region is in particular realized as a subregion of a cabin, in particular an aircraft cabin. A flight passenger seating region preferably adjoins at least one aisle region of the cabin. An "adjoining cabin region" is in particular to mean a region of the cabin that directly adjoins the flight passenger seating region, like in particular an aisle region via which the flight passenger seating region can be reached by a passenger.

By a "door unit" is in particular a sub-assembly to be understood which is configured, in at least one operation state, to separate the at least one flight passenger seating region at least partially from the remainder of the cabin, in particular from at least one aisle region of the cabin. Preferably, in at least one operation state the door unit separates the at least one flight passenger seating region at least partially physically, in particular in such a way that a passageway is obstructed, and at least partially optically, in particular at least partially view-obscuring and preferably completely view-obscuring, from the remainder of the cabin, in particular as far as a height of the at least one enclosure element. The door unit is adjustable at least between an open position and a closed position. Preferably it is additionally possible for the door unit to be held in at least one intermediate position between the open state and the closed state. The door unit is herein preferably made of a solid material, like in particular a plastic, for example a fiber-reinforced plastic, of a composite material (composite panel), like for example a sandwich material with a honeycomb core, of a metal, like in particular aluminum, or of a frame, for example an aluminum frame with a cover that is made of a fabric or of leather. By a "passage region" is in particular a region to be understood which is arranged between the flight passenger seating region and the aisle region of the cabin and by which the two regions are connected. A person, in particular a passenger, may move through the passage region between the flight passenger seating region and the aisle region of the cabin.

By a "bearing device" is in particular a device to be understood which is configured to support a component, like preferably the door unit, such that it is movable between at least two positions. The bearing device is preferably in particular configured to support the door unit such that it is movable between a maximally closed position and a maximally open position. Preferably the bearing device is configured to support the door unit movably along a movement path, said movement path being preferably implemented by a straight movement axis. By a "bearing module" is in particular a part of the bearing device to be understood which supports an element that is to be supported such that it is movable at least in a subregion. The bearing device may comprise one bearing module of preferably two or more bearing modules. Several bearing modules are preferably arranged in different regions of the element that is to be supported, like in particular the door unit, for example in an upper region and in a lower region, in particular in order to ensure even support. Two bearing modules of a bearing device may be implemented identically, whereas it is also conceivable that two bearing modules are implemented at least partially differing from each other. By a "first bearing element" is in particular a bearing element to be understood which is in particular implemented as a primary bearing element and is configured, in a normal operation state, for the movable support of the element that is to be supported, like in particular the door unit. The first bearing element is preferably embodied as a guiding rail. Preferably, the first bearing element is in particular embodied as a primary guiding rail. By a "guiding rail" is in particular a linear guiding element to be understood which is configured to form a bearing path, preferably a straight support axis, along which a further element is linearly displaceable on the guiding rail. A guiding rail is configured such that a guiding element is connected thereon in a form-fit and/or force-fit manner, the guiding element having a degree of freedom relative to the guiding rail at least along a path, in particular along the support axis. By a "second bearing element" is in particular an element to be understood that is realized correspondingly to the first bearing element and is configured to be supported such that it is movable relative to the first bearing element. The second bearing element is preferably supported such that it is movable relative to the first bearing element along the bearing path. The second bearing element is preferably embodied as a bearing carriage. The second bearing element preferably comprises a base body and at least one guiding element that is connected to the base body and is configured to be connected to the first guiding element for a movable support of the second bearing element. By a "third bearing element" is in particular a bearing element to be understood which is in particular realized as a secondary bearing element and is configured, in an operation state that differs from a normal operation state, for the movable support of the element that is to be supported, like in particular the door unit. The third bearing element is preferably configured to movably support the element that is to be supported, in particular the door unit, in particular in the case of a support by the first and second bearing elements being defective or jamming.

The third bearing element is preferably embodied as a guiding rail. Preferably the third bearing element is in particular embodied as a secondary guiding rail. The third bearing element is preferably configured to support the element that is to be supported in a range of at least 50%, preferably 75% and particularly preferentially 100% of a length of the movable support via the first and second bearing elements. Particularly preferentially the third bearing element is configured to support the element that is to be supported, in particular the door unit, in a movement range that is essentially the same as with the first and second bearing elements. In particular, the third bearing element is configured to support the element that is to be supported, in particular the door unit, such that it is movable over an entire movement range between the closed position and the open position.

By an "operation state that differs from a normal operation state" is in particular a state to be understood in which an overload, i. e. a load exceeding a permissible load, acts onto the bearing device, in particular onto the bearing elements of at least one bearing module. The overload is herein preferably exerted by a person, for example a passenger or a staff member, in particular via a force impact, in particular exerting a pressure onto the door unit. Preferably, in the operation state that differs from a normal operation state, in particular a normal functionality of a bearing module is impaired. In particular, in the operation state that differs from a normal operation state a support is affected between the first bearing element and the second bearing element, for example by the two bearing elements jamming with each other, for example by a deformation of at least one of the two bearing elements, by the two bearing elements being blocked by an additional element, or for example by a contamination or gluing (e. g. due to chewing gum) of the first or second bearing element. In the case of an electrical actuation of an adjustment of the door unit between the closed and open positions by means of an electromotor, an "operation state that differs from a normal operation state" is-may also mean a breakdown of electrics, in particular of the electromotor. In particular, in the operation state that differs from a normal operation state an adjustment of the door unit by a relative movement of the first bearing element and the second bearing element with respect to each other is not possible. In the operation state that differs from a normal operation state, as a result of malfunctioning the first bearing element and the second bearing element are connected to each other in a positionally fixed manner. By the term "to support the second bearing element movably" is in particular to be understood that the second bearing element is displaceable, in particular linearly movable, along a movement path, preferably a movement axis, in particular relative to the third bearing element and thus to the component which the third bearing element is fastened on. "Configured" is in particular to mean specifically designed and/or equipped. By an object being configured for a certain function is in particular to be understood that the object fulfills and/or executes said certain function in at least one application state and/or operation state. An implementation according to the invention advantageously allows integrating a redundancy into the support of a door unit of the aircraft seat module, thus reducing a risk of a door unit being no longer movable out of its closed position toward the open position. This in particular allows improving safety of an aircraft seat module as locking in of a passenger in the flight passenger seating region, caused by a defective support of the door unit, is advantageously preventable.

Furthermore, it is proposed that the second bearing element is configured, in a normal operation state, to be fixed at the third bearing element in a positionally secure fashion. As a result, advantageously a support of the door unit may in the normal operation state be effected only via the first bearing element and the second bearing element.

It is also proposed that the first bearing element is embodied as a guiding rail which is fixedly connected with the enclosure unit or with the door unit. "Fixedly connected" is in particular to mean fixedly connected to each other via a force-fit and/or form-fit connection and/or via substance-to-substance bond, such that it is in a mounted state not possible for two elements to make a relative movement with respect to each other. This advantageously enables an especially advantageous implementation of the bearing device.

Moreover, it is proposed that the third bearing element is realized as a guiding rail, which is fixedly connected with the other enclosure unit or door unit. By the third bearing element being "fixedly connected to the other enclosure unit or door unit" is in particular to be understood that the third bearing element is arranged on the other one of the two units with respect to the first bearing element, which means that if the first bearing element is arranged on the enclosure unit, the third bearing element is arranged on the door unit and if the first bearing element is arranged on the door unit, the third bearing element is fixedly connected to the enclosure unit. This advantageously enables an especially advantageous implementation of the bearing device.

It is further proposed that the second bearing element is embodied as an intermediate bearing element arranged between the first bearing element and the third bearing element. By an "intermediate bearing element" is in particular an element to be understood which is in terms of position and in terms of function arranged between two elements, in particular between the first bearing element and the third bearing element. A force transmission between the first bearing element and the third bearing element is preferably effected at least substantially via the intermediate bearing element. This allows an especially advantageous implementation of the third bearing element.

Furthermore it is proposed that the second bearing element is embodied as a bearing carriage, which is supported relative to the first and the third bearing elements via a slide and/or swivel bearing. By a "bearing carriage" is in particular an element to be understood which preferably comprises a base body and at least one guiding element which is connected with the base body and is supported such that it is movable with the first and third bearing elements via a slide bearing or a swivel bearing. By a "slide bearing" is in particular a bearing to be understood in which two elements, which are supported relative to each other, are in direct contact and and slide on each other when moving/moved relative to each other. By a "swivel bearing" is in particular a bearing to be understood in which a bearing component, like in particular a roller bearing or a roller, rolls on a guide path in the case of a relative movement of the two bearing elements with respect to each other. Principally it is also conceivable that one bearing element is embodied as a toothed bar, as a toothed wheel, as a spindle, as a toothed belt or as a different bearing element via which a movement can be transmitted to the door unit. This enables an especially advantageous implementation of the second bearing element.

Beyond this it is proposed that the bearing module comprises a locking unit, which is configured, in a normal operation state, to couple the second bearing element with the third bearing element in a positionally fixed manner. By a "locking unit" is in particular a unit to be understood which is configured to fixedly couple two elements with each other in one state, preferably in a normal operation state, and to undo a coupling in a second state, in particular an overload state, thus allowing a movement of the two elements relative to each other. The locking unit may preferably be formed of at least two locking elements, which are connectable to each other in a force-fit and/or form-fit manner. Principally it is also conceivable that the locking unit is realized by a predetermined breaking point which irreversibly breaks in an overload case. "To couple in a positionally fixed manner" is in particular to mean connected in a defined position with respect to each other, there being in particular essentially no relative movement possible between two coupled elements. Preferably the locking unit is in particular configured to autonomously bring about a coupling and an uncoupling of the second bearing element with respect to the first bearing element. Principally it is also conceivable that the locking unit comprises a controlled locking element, which is adjustable between a coupled position and an uncoupled position on the basis of a sensor signal or on the basis of an actuation of an actuation element by an operator. This enables an especially advantageous implementation of the bearing module.

It is also proposed that the locking unit is configured for locking the second bearing element in a force-fit and/or form-fit manner. By "locking in a force-fit and/or form-fit manner" is in particular to be understood that in the normal operation state a locking is brought about by a force-fit connection and/or by a form-fit connection between two locking elements. This enables an especially advantageous implementation of the locking unit.

It is moreover proposed that the locking unit comprises a locking element which is fixedly connected with the enclosure unit or with the door unit, and which is configured for uncoupling the locking unit at a defined force. By a "locking element" is in particular an element to be understood which is in a normal operation state connected in a force-fit and/or form-fit manner to an element that is correspondingly implemented and which, in a further operation state that differs from the normal operation state, uncouples the locking unit autonomously when a defined acting force has been reached. This enables an especially advantageous implementation of the locking unit.

Furthermore, it is proposed that for an uncoupling the locking element is configured to be at least partially deformed elastically. "To at least partially deform elastically" is in particular to mean that at least a subregion of the locking element is deformed elastically. The locking element is preferably implemented of an elastically deformable material, preferably in particular of a polymer, a caoutchouc polymer, a natural caoutchouc or of a different synthetic material. It is principally also conceivable that the locking element is implemented of a different elastically deformable material. It is principally also conceivable that the locking element is structured at least in two parts, having an elastically deformable subregion and a subregion that is not elastically deformable. This enables an implementation of the locking element that is particularly simple and is in particular advantageous for a reversible locking of the locking unit.

It is further proposed that the locking unit comprises a locking element that is implemented as a holding contour and is configured to hold the locking element in the normal operation state. By a "holding contour" is in particular a contour to be understood which is in a normal operation state engaged into in a form-fit fashion by a locking element that is implemented correspondingly. It would principally also be conceivable that the holding contour is at least partially elastically deformable. It would herein be conceivable that the locking element is not or only minimally elastically deformable. Preferably, for an overpressurizing of the holding contour a force of at least 110 N is necessary. This allows implementing the locking unit in an especially simple manner.

It is moreover proposed that the locking unit is configured to be brought back into its locking position after an unlocking. In this way it is advantageously possible that the door unit back is brought back into its normal position after an unlocking.

Furthermore it is proposed that the second bearing element engages around the door unit at least in a subregion. This allows providing an especially advantageous bearing unit.

Beyond this it is proposed that the connection element comprises a connection region in which the second bearing element is fixed in a positionally secure manner in the normal operation state. In this way the bearing element is advantageously be connectable to the connection element.

It is further proposed that the connection region is realized as a slide rail. This allows an especially advantageous implementation of the connection region.

It is also proposed that in the operation state that differs from the normal operation state, the door unit is in a lower region configured in cantilever fashion. This preferably allows a lower bearing module of the bearing device being implemented in an especially simple manner, with a low number of components.

Herein the aircraft seat module according to the invention shall not be limited to the application and implementation described above. In particular, for the purpose of fulfilling a functionality that is described here, the aircraft seat module according to the invention may comprise a number of individual elements, components and units that differs from a number given here.

DRAWINGS

Further advantages will become apparent from the following description of the drawings. In the drawings five exemplary embodiments of the invention are illustrated. The drawings, the description and the claims contain a plurality of features in combination. Someone skilled in the art will purposefully also consider the features separately and will find further expedient combinations.

Figure 2:
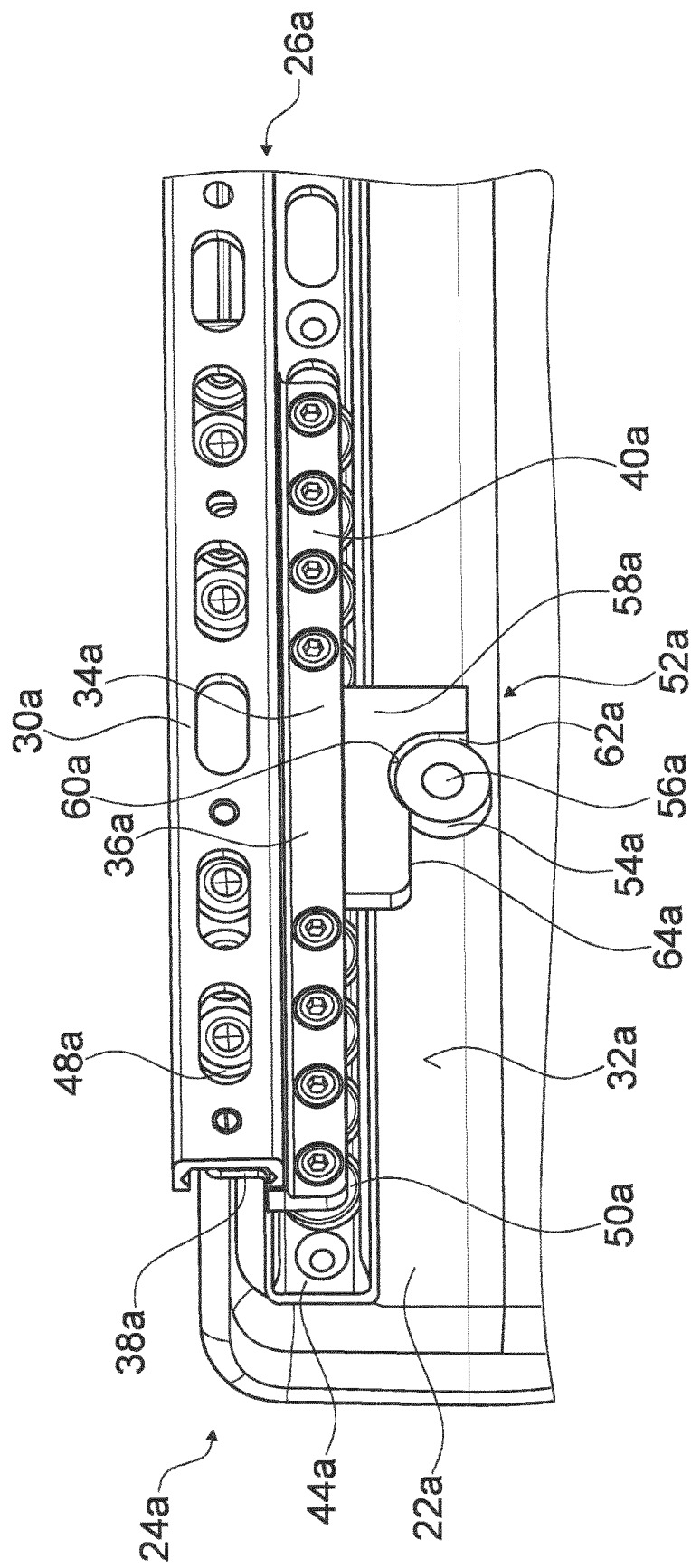
Figure 3:
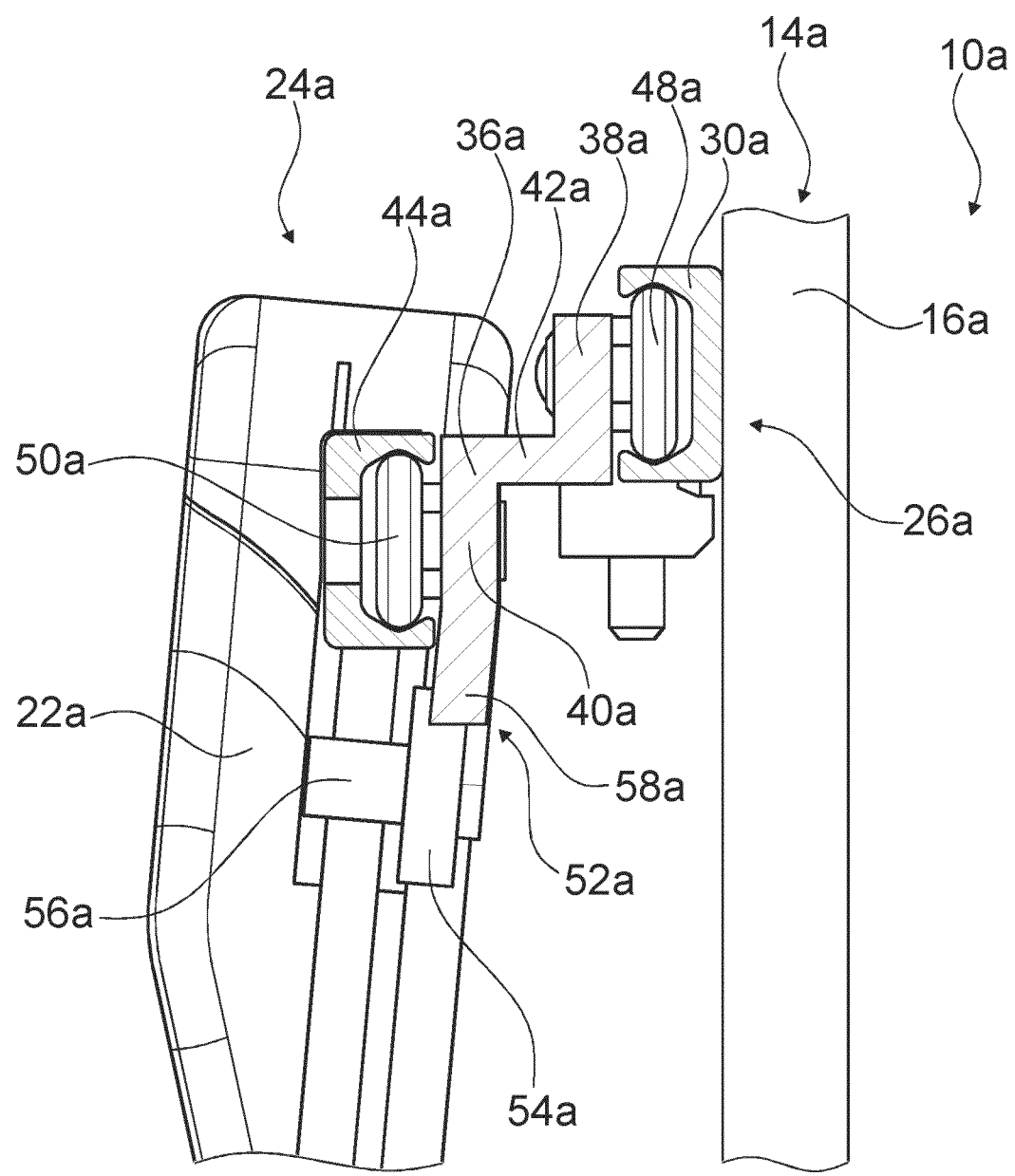
Figure 4:
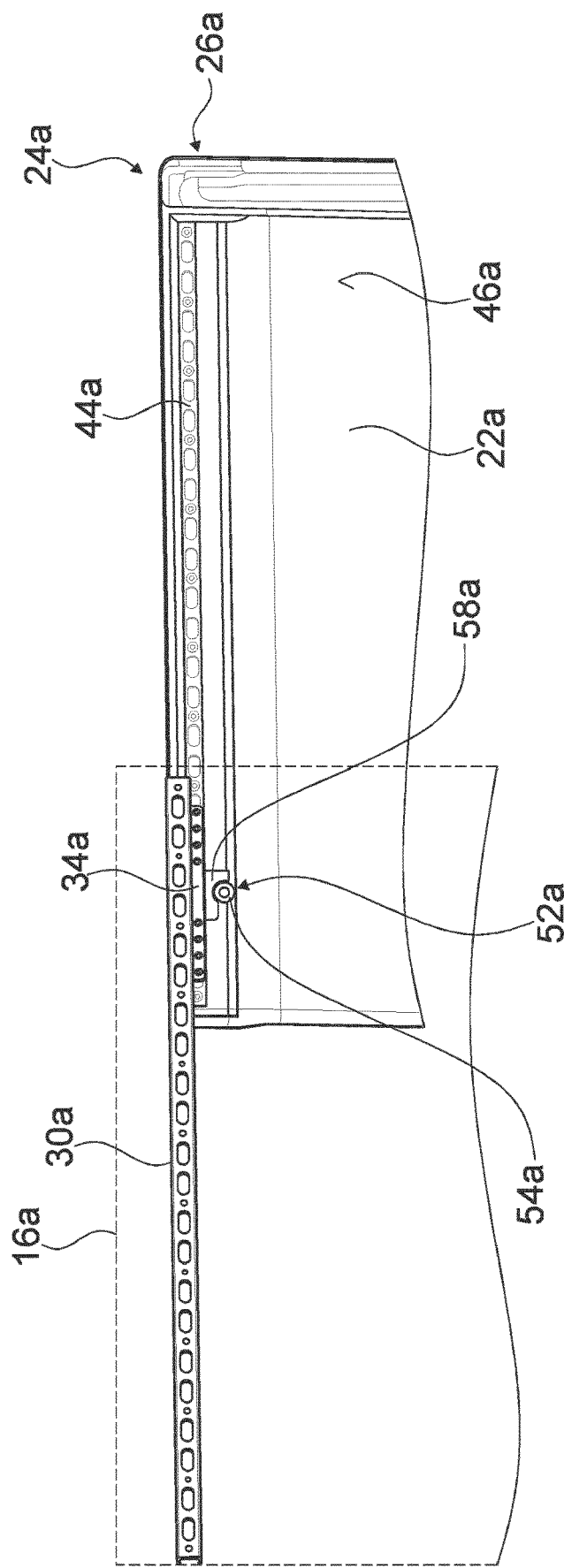
Figure 5:
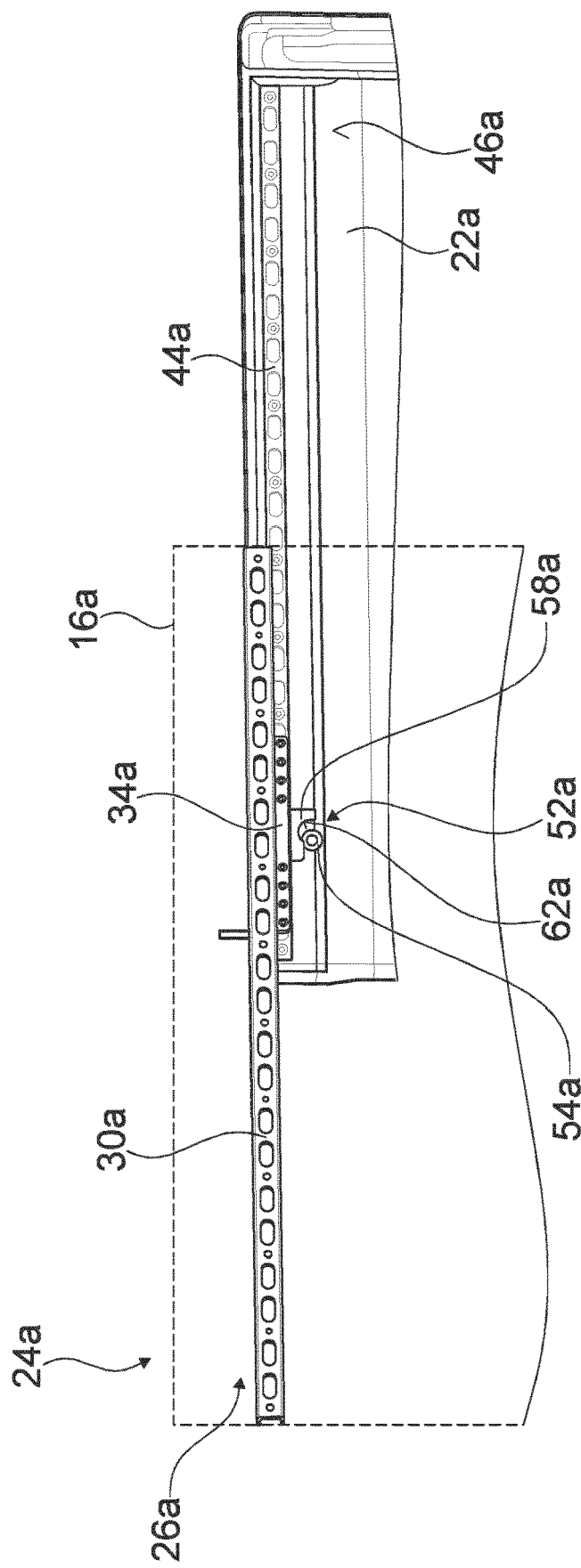
Figure 6:
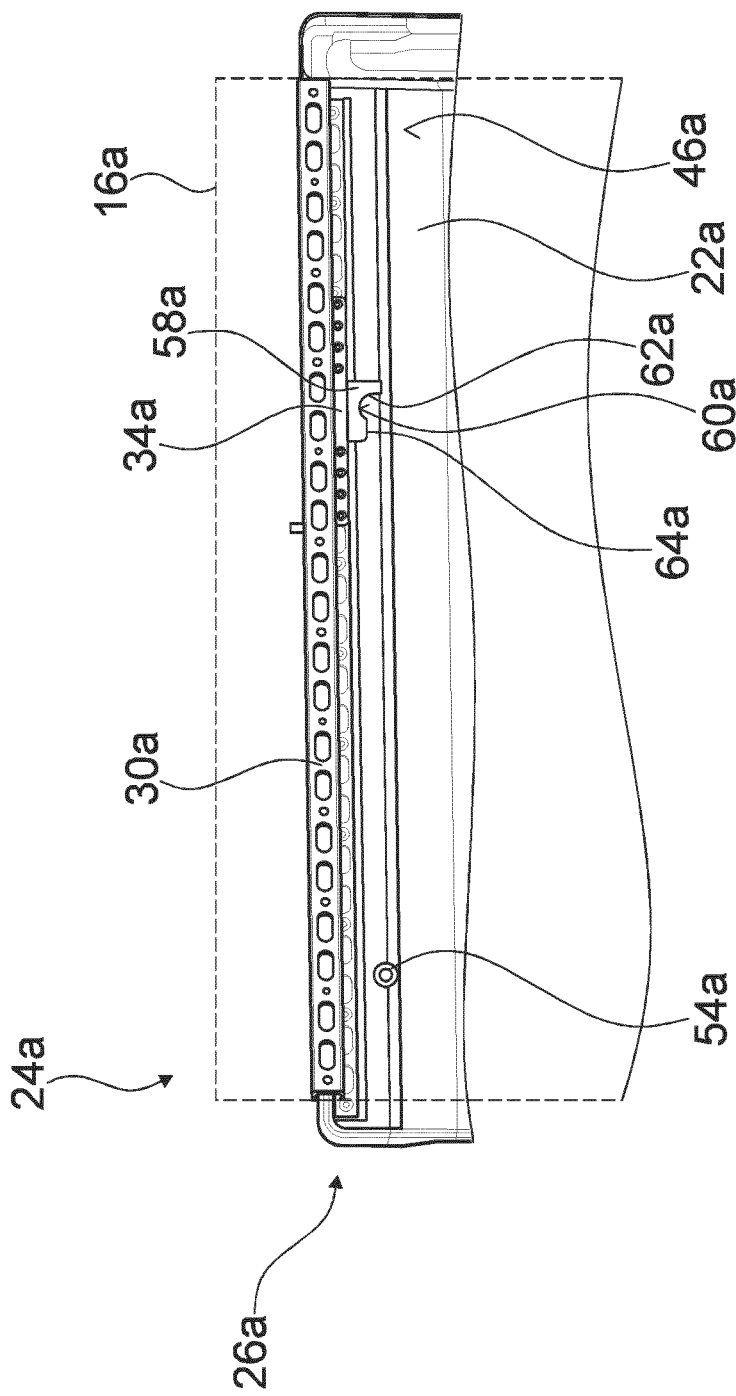
Figure 7:
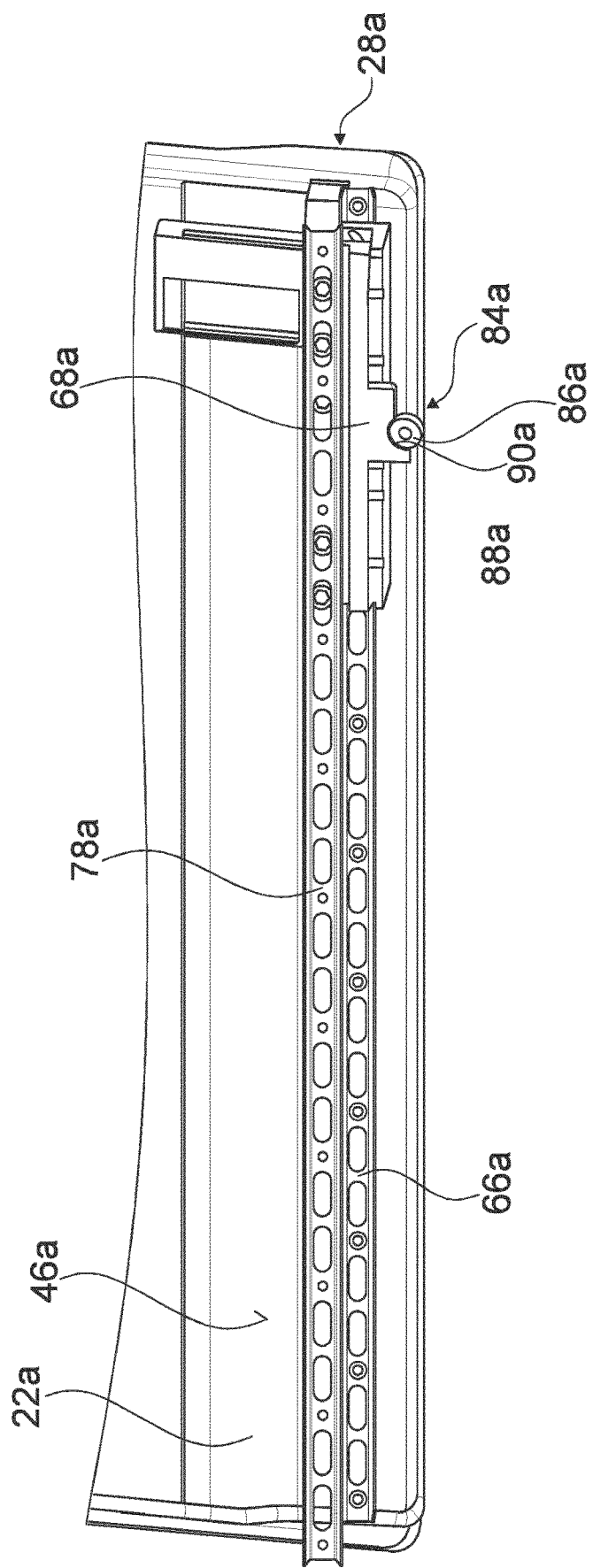
Figure 8:
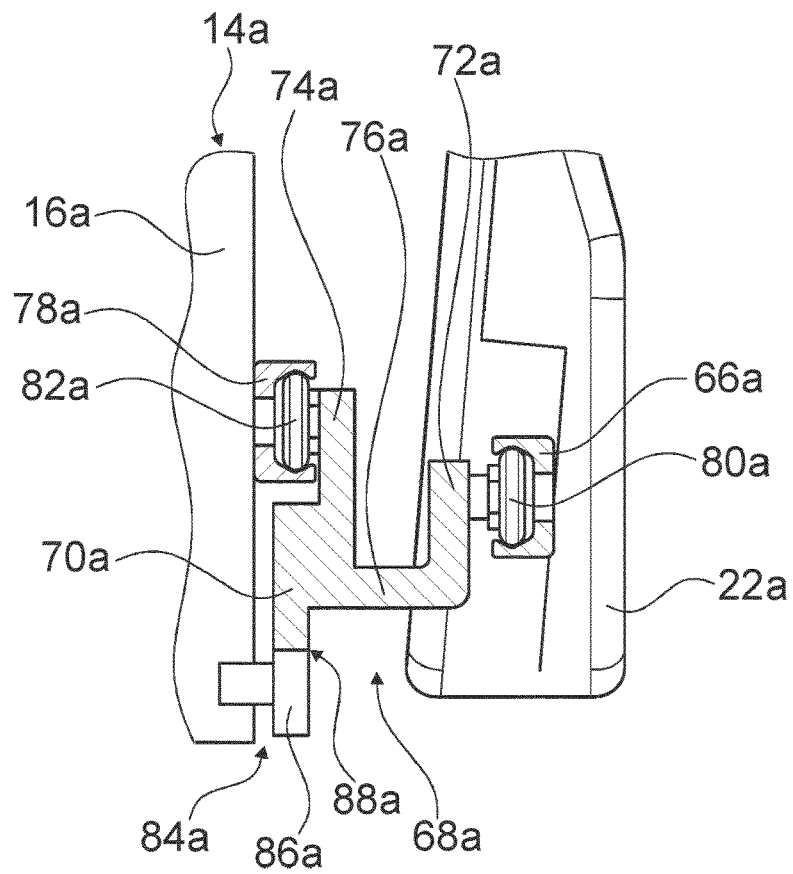
Figure 9:
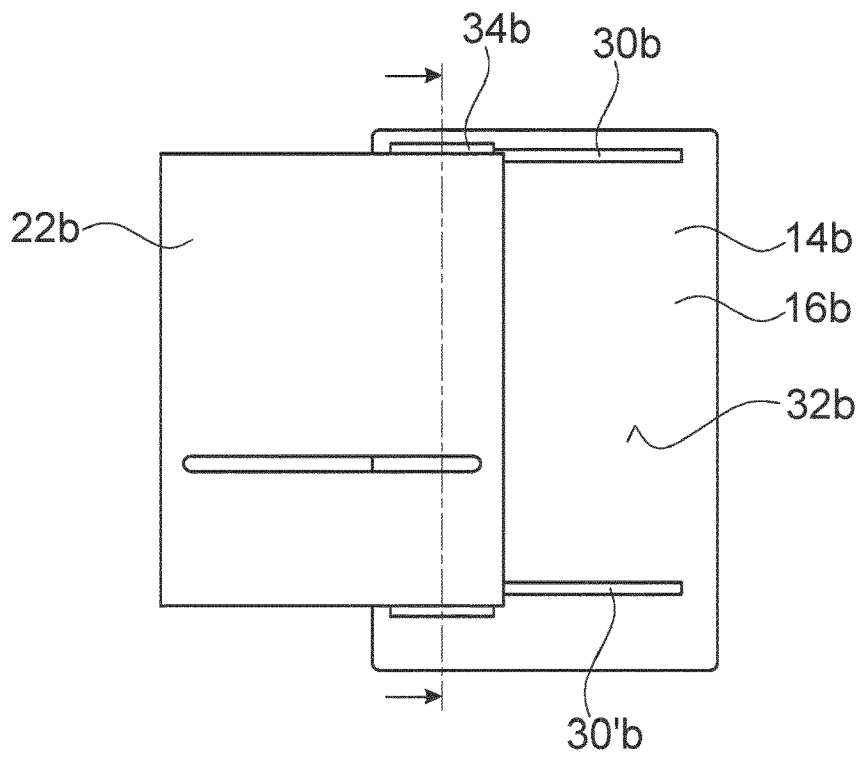
Figure 10:
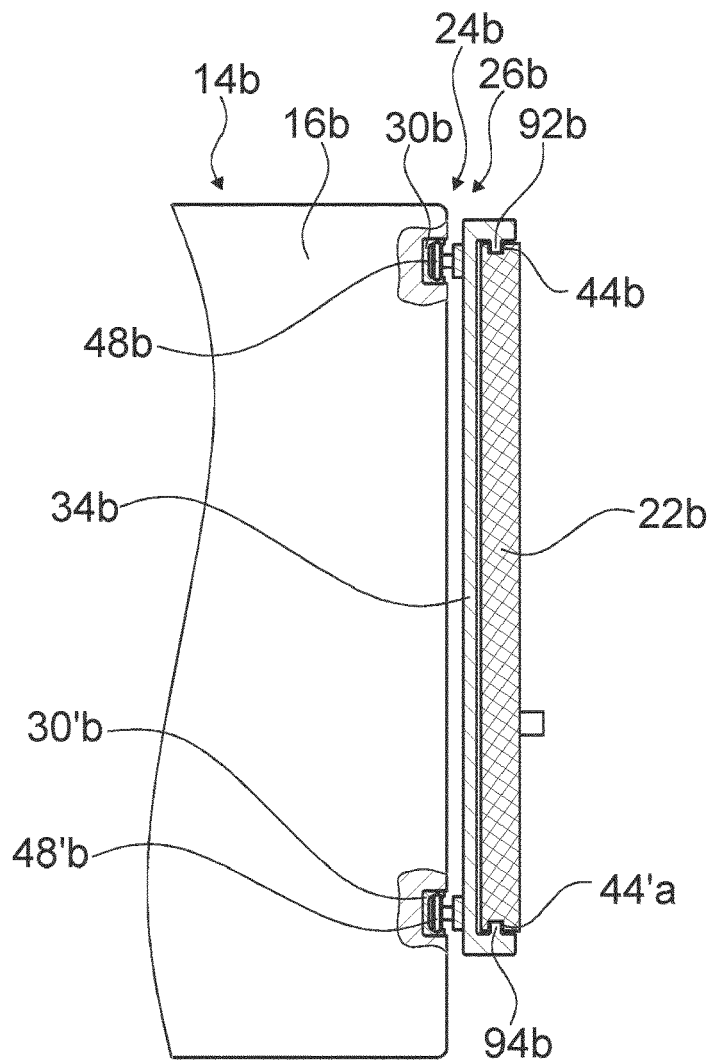
Figure 11:
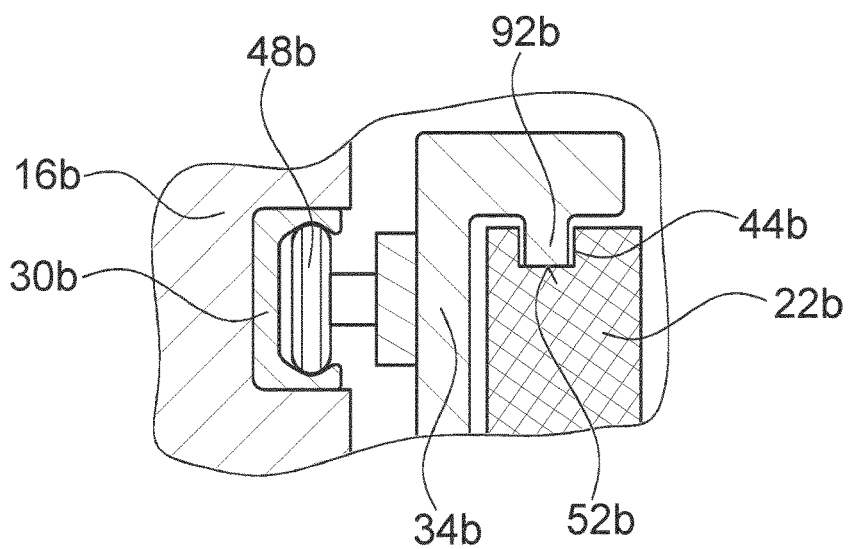
Figure 12:
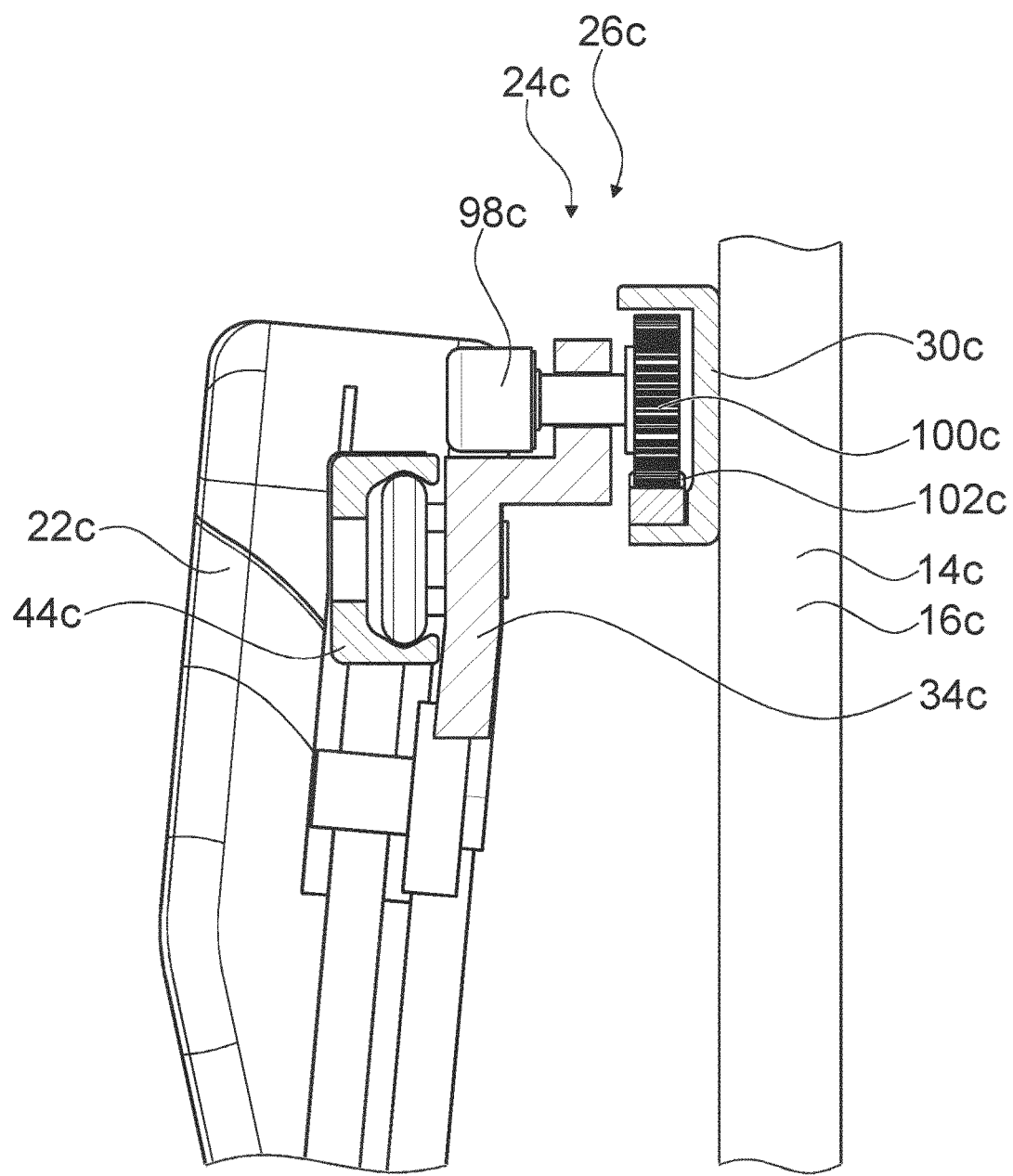
Figure 13:
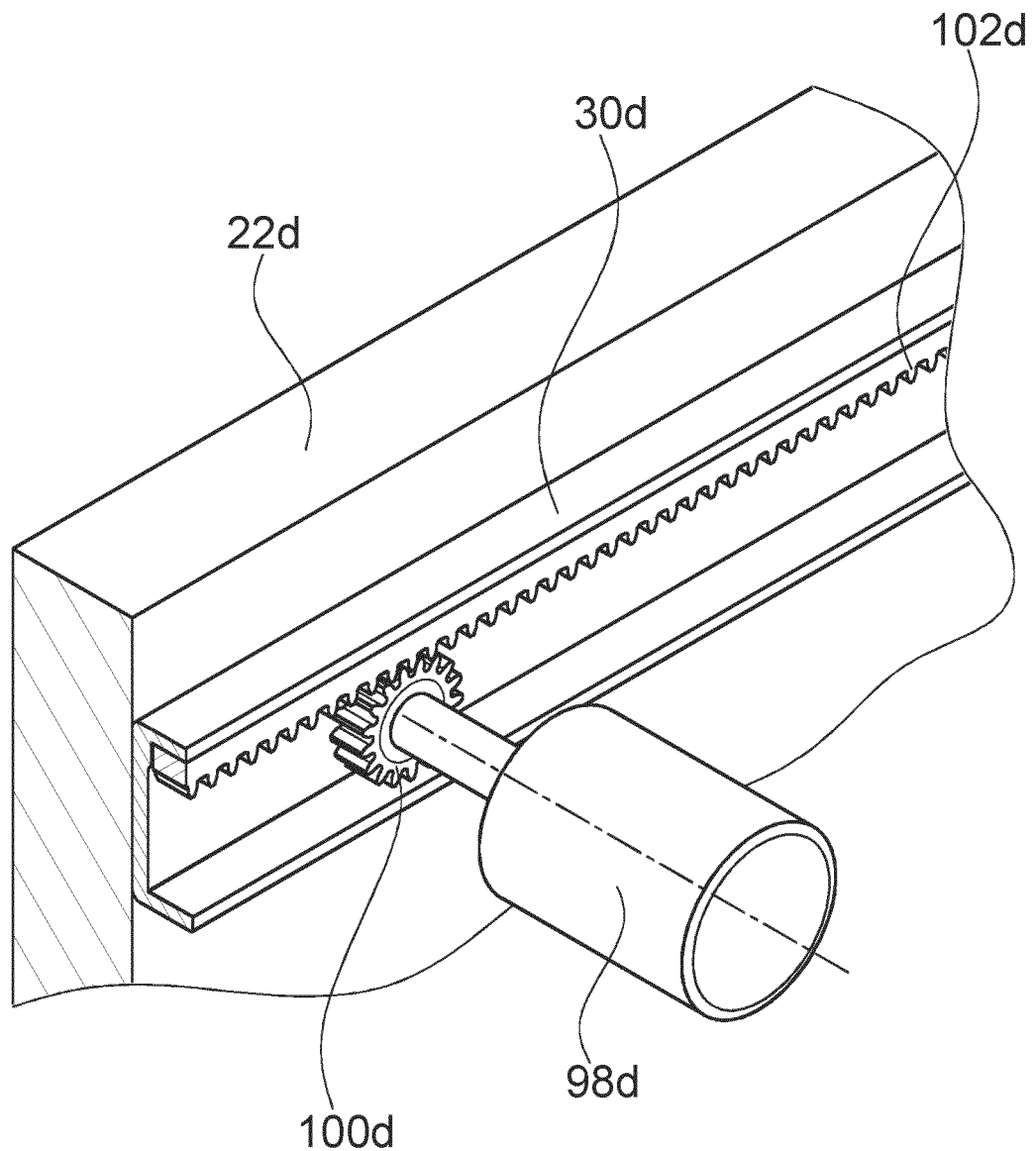
Figure 14:
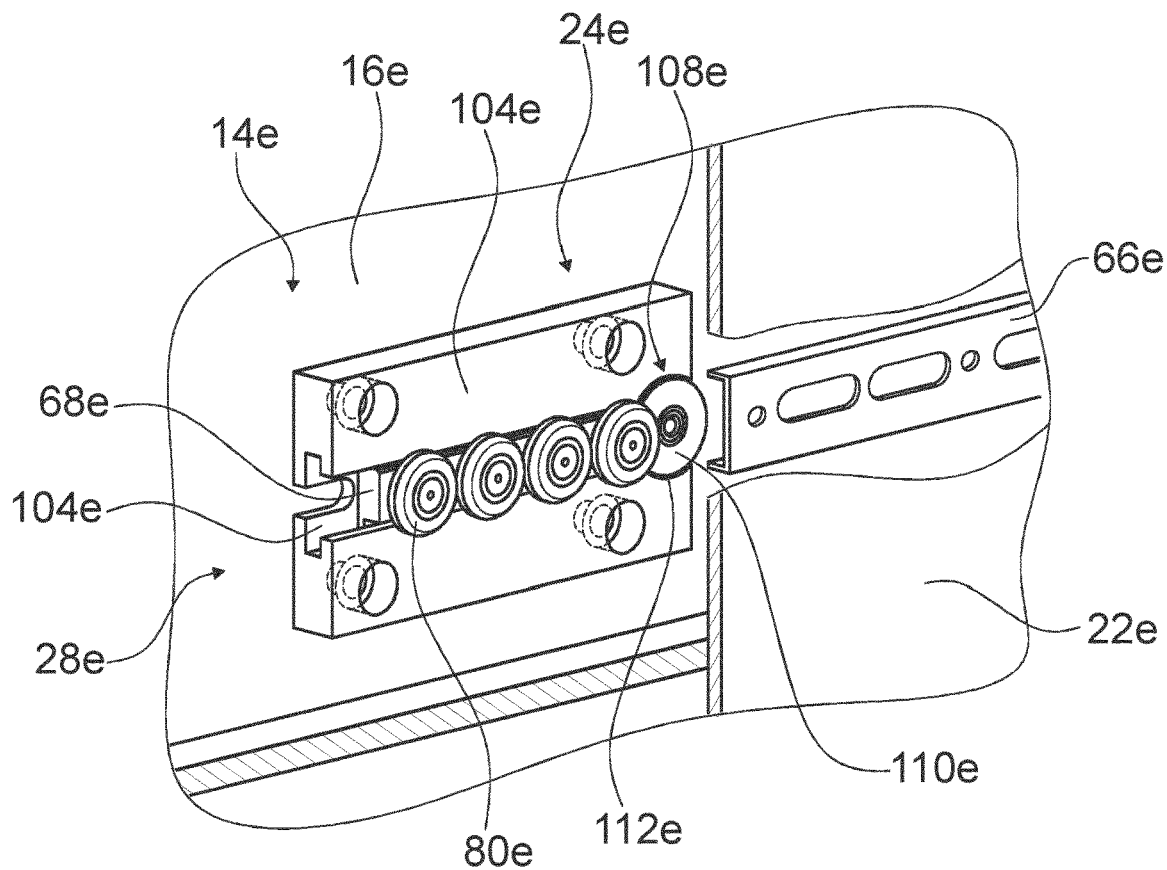
Figure 15:
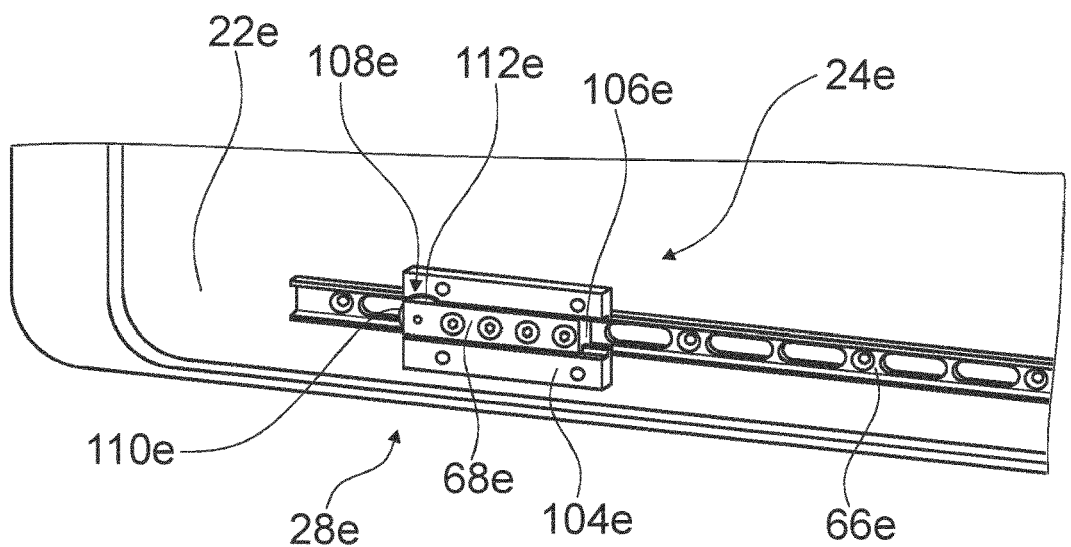
Figure 16:
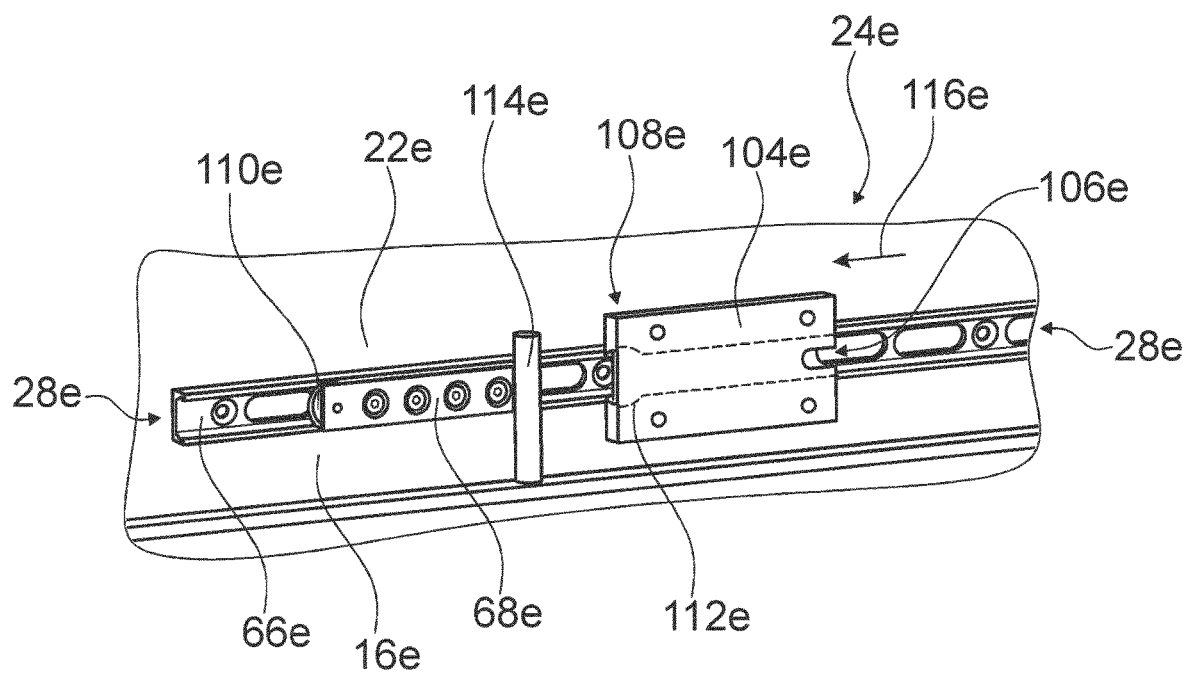

It is shown in:

FIG. 1 a schematic top view onto a portion of an aircraft seating cabin, with an aircraft seat module comprising an enclosure unit and a door unit, FIG. 2 a schematic detail view of a first bearing module of a bearing device for supporting the door unit, FIG. 3 a schematic sectional view through the first bearing module, FIG. 4 a further schematic view of the bearing module in a normal operation state, FIG. 5 a schematic view of the first bearing module in an operation state that differs from the normal operation state, FIG. 6 a further schematic view of the first bearing module in an operation state that differs from the normal operation state, FIG. 7 a schematic illustration of a second bearing module of the bearing device in a normal operation state, FIG. 8 a schematic sectional view through the second bearing module, FIG. 9 a schematic view of a portion of an aircraft seat module with an enclosure unit and with a door unit that is supported via a bearing device, in a second exemplary embodiment, FIG. 10 a schematic sectional view through the door unit and the bearing device, FIG. 11 a schematic sectional view of the bearing device, FIG. 12 a schematic sectional view through a bearing device of an aircraft seat module, in a third exemplary embodiment, FIG. 13 a schematic view of a portion of a bearing device of an aircraft seat module, in a fourth exemplary embodiment, FIG. 14 a schematic partial view of a bearing device of an aircraft seat module, in a fifth exemplary embodiment, FIG. 15 a further illustration of the bearing device in the fifth exemplary embodiment, and FIG. 16 an illustration of the bearing device in the fifth exemplary embodiment in an operation state that differs from the normal operation state.

DESCRIPTION OF THE EXEMPLARY EMBODIMENTS

In FIGS. 1 to 8 a first exemplary embodiment of the aircraft seat module is shown. The aircraft seat module is realized as part of the interior fittings of an aircraft cabin. Preferably several aircraft seat modules are arranged in an aircraft cabin. The aircraft seat module forms a flight passenger seating region 10a. The flight passenger seating region 10a is implemented as a region that is in particular available to a passenger for himself during a flight. Preferably, the flight passenger seating region 10a is in particular implemented as a business-class or first-class flight passenger seating region. The aircraft cabin comprises at least one aisle region 20a. Via the aisle region 20a the flight passenger seating region 10a is in particular accessible for a passenger. The aircraft seat module comprises an aircraft seat 12a, which is arranged in the flight passenger seating region 10a. Preferably, the aircraft seat 12a is in particular implemented as an aircraft seat 12a that is adjustable from a sitting position into a lying-down position. The aircraft seat module comprises an enclosure unit 14a. The enclosure unit 14a is configured to separate the flight passenger seating region 10a at least partially from a remainder of the aircraft cabin. The enclosure unit 14a is configured to at least essentially surround the flight passenger seating region 10a. The enclosure unit 14a is in particular configured to separate the flight passenger seating region 10a spatially from a remainder of the aircraft cabin, in particular a cabin aisle, in particular in order to create an augmented privacy atmosphere for a passenger in the flight passenger seating region 10a. The enclosure unit 14a preferably extends to a height of 1.30 m. Here a height corresponds to the given air traffic standards, which may of course change. Principally it is also conceivable that the enclosure unit 14a extends in subregions to a different height and/or as far as a cabin ceiling of the aircraft cabin. The enclosure unit 14a may herein have different heights in different subregions. The enclosure unit 14a comprises an enclosure element 16a. The enclosure element 16a surrounds the flight passenger seating region 10a at least partially. The enclosure element 16a may principally separate the flight passenger seating region 10a off on its own or together with an enclosure unit 14a of a further aircraft seat module. The enclosure element 16a is preferably made of a composite material. Principally it is also conceivable that the enclosure element 16a is made of a different material that is deemed expedient by someone skilled in the art. Principally it is also conceivable that the enclosure unit 14a comprises several enclosure elements 16a. The enclosure unit 14a forms a passage region 18a. The passage region 18a connects the flight passenger seating region 10a and the adjoining aisle region 20a of the aircraft cabin. Through the passage region 18a a person, in particular a passenger, may get from the aisle region 20a into the flight passenger seating region 10a and vice versa. Preferably no enclosure element 16a is arranged in the passage region 18a. The passage region 18a preferably has a width of 38 cm.

The aircraft seat module comprises a door unit 22a. The door unit 22a is configured, in at least one operation state, to delimit the flight passenger seating region 10a at least partially from an adjoining cabin region, in particular from the aisle region 20a. The door unit 22a is configured for closing the passage region 18a in a closed state. In a fully closed state, the door unit 22a closes the passage region 18a completely. It is herein in particular conceivable that a gap remains between the door unit 22a and the cabin floor, in particular in a lower region. In the fully closed state, the door unit 22a extends at least in a subregion completely between the enclosure element 16a and a further enclosure element 96a, which delimit the passage region 18a. The further enclosure element 96a may in particular be an enclosure element of a further enclosure unit that is arranged in front of the enclosure unit 14a and encloses a further aircraft seat. In an open state the door unit 22a is configured to leave the passageway 18a free. Preferably, in the open state the door unit 22a has been moved completely out of the passage region 18a. The door unit 22a is connected to the enclosure unit 14a, in particular the enclosure element 16a. Principally it would also be conceivable that the door unit 22a is connected to the further enclosure element 96a of the front enclosure unit.

For a support of the door unit 22a the aircraft seat module comprises a bearing device 24a. The bearing device 24a is configured to support the door unit 22a movably on the enclosure unit 14a. The door unit 22a is connected to the enclosure element 16a via the bearing device 24a. The door unit 22a is adjustable between the open state and the closed state by means of the bearing device 24a. The bearing device 24a is preferably embodied as a linear bearing device. The door unit 22a is linearly displaceable between a closed position and an open position by means of the bearing device 24a that is embodied as a linear bearing device.

The bearing device 24a comprises a first bearing module 26a. The first bearing module 26a is configured to support the door unit 22a in an upper region. The first bearing module 26a is in particular arranged in an upper region of the door unit 22a. The bearing device 24a comprises a second bearing module 28a. The second bearing module 28a is configured to support the door unit 22a in a lower region. The second bearing module 28a is arranged in a lower region of the door unit 22a. By means of the two bearing modules 26a, 28a, which are arranged on opposite-situated regions of the door unit 22a, an especially even support of the door unit 22a is achievable.

The first bearing module 26a comprises a first bearing element 30a. The first bearing element 30a is embodied as a guiding rail, in particular as a primary guiding rail. The first bearing element 30a forms a guiding contour, which preferably has an undercut. The first bearing element 30a that is embodied as a guiding rail has a longitudinal main extent. The first bearing element 30a forms a bearing path along which elements can be supported such that they are movable, in particular axially displaceable, relative to the bearing element 30a. The first bearing element 30a is fixedly connected with the enclosure unit 14a. The first bearing element 30a is in particular fixedly connected with the enclosure element 16a. The first bearing element 30a is connected on an inner side 32a of the enclosure element 16a. Preferably the first bearing element 30a is fixedly connected to the enclosure element 16a by screw connections. Principally it is also conceivable that the first bearing element 30a is connected to the enclosure element 16a in a fix and positionally secure fashion, for example via a gluing or clip connection.

The first bearing module 26a comprises a second bearing element 34a. The second bearing element 34a is embodied as an intermediate element. The second bearing element 34a is preferably in particular embodied as a bearing carriage. The second bearing element has a base body 36a. The base body 36a has a longitudinal extent. The base body 36a forms a first connection region 38a. The first connection region 38a forms an upper portion of the base body 36a. The first connection region 38a is configured for a connection of the first bearing element 30a. The base body 36a comprises a second connection region 40a. The second connection region 40a forms a lower portion of the base body 36a. The second connection region 40a is in particular configured for a connection of a further element, preferably in particular for a connection of a further bearing element. The two connection regions 38a, 40a in each case extend in a horizontal direction. The connection regions 38a, 40a are arranged spaced apart from each other in a transverse direction. The two connection regions 38a, 40a are connected via a middle region 42a at a lower end of the first connection region 38a and at an upper end of the second connection region 40a. The two connection regions 38a, 40a and the middle region 42a together form the base body 36a, preferably in one piece.

The first bearing module 26a comprises a third bearing element 44a. The third bearing element 44a is embodied as a guiding rail. The third bearing element 44a is in particular embodied as a secondary guiding rail. The third bearing element 44a that is embodied as a guiding rail has a longitudinal main extent. The third bearing element 44a forms a guiding contour, which preferably has an undercut. The third bearing element 44a is fixedly connected with the door unit 22a. The third bearing element 44a forms a bearing path along which elements can be supported such that they are movable, in particular axially displaceable, relative to the third bearing element 44a. The third bearing element 44a is connected at an inner side 46a of the door unit 22a. Preferably the third bearing element 44a is fixedly connected to the door unit 22a via screw connections. It is principally also conceivable that the third bearing element 44a is connected to the door unit 22a in a fix and positionally secure manner via an adhesive connection or clip connection. Preferably, the third bearing element 44a that is embodied as a guiding rail is oriented parallel to the first bearing element 30a. Preferably the third bearing element 44a has an orientation that corresponds to the first bearing element 30a. However, it is principally also conceivable that the third bearing element 44a is tilted relative to the first bearing element 30a by an angle, preferably by 90°, the guiding contours being at all times oriented in parallel. A tilted arrangement of the third bearing element 44a in particular allows an implementation of the bearing module 26a that saves more space and/or is adapted to constructional conditions.

The second bearing element 34a is movably connected with the first bearing element 30a. The second bearing element 34a is in particular supported such that it is linearly displaceable relative to the first bearing element 30a along the bearing path of the first bearing element 30a. The second bearing element 34a comprises several swivel bearings 48a, via which the second bearing element 34a is supported displaceably relative to the first bearing element 30a. The swivel bearings 48a are implemented as roller elements which are fixed rotatably on the base body 36a of the second bearing element 34a. The swivel bearings 48a are in particular connected rotatably to the base body 36a via slide bearings. In particular, the swivel bearings 48a are preferably supported so as to be gliding on a pin. It would principally also be conceivable that the swivel bearings 48a which are embodied as roller elements are supported via a roller bearing such that they are rotatable on a pin. The swivel bearings 48a are in particular mounted in the first connection region 38a of the base body 36a. The swivel bearings 48*a* are in particular distributed over a length of the base body 36*a*. Herein the swivel bearings 48*a* are preferably distributed evenly in a main extension direction of the base body 36*a*. In the present embodiment, the second bearing element 34*a* comprises eight swivel bearings 48*a*. Principally a different number of swivel bearings 48*a* is also conceivable. Preferably the second bearing element 34*a* comprises two swivel bearings 48*a*. In a mounted state the swivel bearings 48*a* are arranged in the first bearing element 30*a* that is embodied as a guiding rail. The swivel bearings 48*a* are in particular arranged in the guiding contour of the first bearing element 30*a*. The swivel bearings 48*a* are configured to roll in the guiding contour of the first bearing element 30*a* for a displaceable support of the door unit 22*a*.

In a normal operation state the bearing module 26*a* is configured to support the door unit 22*a* movably via the first bearing element 30*a* and the second bearing element 34*a*. In the normal operation state an adjustment between the closed and the open position of the door unit 22*a* is brought about by a relative movement of the second bearing element 34*a* and the first bearing element 30*a*. For an adjustment of the door unit 22*a* between the closed and the open position, the swivel bearings 48*a* of the second bearing element 34*a* run in the guiding contour of the first bearing element 30*a*. An adjustment force for an adjustment of the door unit 22*a* may herein be exerted directly onto the door unit 22*a* by a person, for example a passenger. It is principally also conceivable that an adjustment force is exerted onto the door unit 22*a* by an actuator that is operated by a person, for example a passenger.

The second bearing element 34*a* is movably connected with the third bearing element 44*a*. The second bearing element 34*a* is in particular supported such that it is linearly displaceable with respect to the third bearing element 44*a* along the bearing path of the third bearing element 44*a*. The second bearing element 34*a* comprises several swivel bearings 50*a*, via which the second bearing element 34*a* is supported such that it is displaceable with respect to the third bearing element 44*a*. The swivel bearings 50*a* are embodied as roller elements which are rotatably fixed on the base body 36*a* of the second bearing element 34*a*. The swivel bearings 50*a* are in particular connected to the base body 36*a* such that they are rotatable via slide bearings. In particular, the swivel bearings 50*a* are preferably supported so as to be gliding on a pin. Principally it would also be conceivable that the swivel bearings 50*a* which are embodied as roller elements are supported on a pin such that they are rotatable via a roller bearing. The swivel bearings 50*a* are in particular mounted in the second connection region 40*a* of the base body 36*a*. The second connection region 40*a* is configured for a connection of the third bearing element 44*a*. The swivel bearings 50*a* are in particular distributed over a length of the base body 36*a*. Herein the swivel bearings 50*a* are preferably distributed evenly in a main extension direction of the base body 36*a*. In the present embodiment, the second bearing element 34*a* comprises eight swivel bearings 50*a*. Principally a different number of swivel bearings 50*a* is also conceivable. Preferably the second bearing element 34*a* comprises at least two swivel bearings 50*a*. In a mounted state the swivel bearings 50*a* are arranged in the third bearing element 44*a* that is embodied as a guiding rail. The swivel bearings 50*a* are in particular arranged in the guiding contour of the third bearing element 44*a*. The swivel bearings 50*a* are configured to roll in the guiding contour of the third bearing element 44*a* for a displaceable support of the door unit 22*a*.

The third bearing element 44*a* is configured, in an operation state that differs from a normal operation state, for a movable support of the second bearing element 34*a*. In the operation state that differs from the normal operation state, the bearing module 26*a* is configured to support the door unit 22*a* movably via the third bearing element 44*a* and the second bearing element 34*a*. In the operation state that differs from the normal operation state, an adjustment between the closed and the open position of the door unit 22*a* is brought about by a relative movement of the second bearing element 34*a* and the third bearing element 44*a*. For an adjustment of the door unit 22*a* between the closed and the open position, the swivel bearings 50*a* of the second bearing element 34*a* run in the guiding contour of the third bearing element 44*a*. An adjustment force for an adjustment of the door unit 22*a* may herein be exerted directly onto the door unit 22*a* by a person, for example a passenger. It is principally also conceivable that an adjustment force is exerted onto the door unit 22*a* by an actuator that is operated by a person, for example a passenger.

The second bearing element 34*a* is configured, in a normal operation state, to be fixed on the third bearing element 44*a* in a positionally secure manner. By the fixation of the second bearing element 34*a* on the third bearing element 44*a*, a relative movement of the second bearing element 34*a* with respect to the third bearing element 44*a* is prevented. By the fixation of the second bearing element 34*a* on the third bearing element 44*a*, in particular a displacement of the door unit 22*a* via the second bearing element 34*a* and the third bearing element 44*a* is prevented. By the fixation of the second bearing element 34*a* on the third bearing element 44*a*, a movable support of the door unit 22*a* is realized merely by means of the first bearing element 30*a* and the second bearing element 34*a*. For a fixation of the second bearing element 34*a* to the third bearing element 44*a*, the bearing module 26*a* comprises a locking unit 52*a*. The locking unit 52*a* is configured, in a normal operation state, for coupling the second bearing element 34*a* with the third bearing element 44*a* in a positionally fixed manner. The locking unit 52*a* is configured, in a locking state, for locking the second bearing element 34*a* in a force-fit and form-fit manner. The locking unit 52*a* is configured, in a locking state, for coupling the second bearing element 34*a* with the third bearing element 44*a* in a force-fit and form-fit manner. In particular, the locking unit 52*a* is configured for connecting the second bearing element 34*a* in a force-fit and/or form-fit manner to the element which the third bearing element 44*a* is connected to, i. e. in particular to the door unit 22*a*.

For a locking of the second bearing element 34*a*, the locking unit 52*a* comprises a locking element 54*a*, which is fixedly connected with the door unit 22*a*. The locking element 54*a* is configured to uncouple the locking unit 52*a* at a defined force. The locking element 54*a* is configured to be at least partially deformed elastically. The locking element 54*a* is in particular made of an elastic synthetic material. The locking element 54*a* preferably has a round shape. The locking element 54*a* is preferably realized in a ring shape. The locking element 54*a* is fixedly connected with the door unit 22*a* via a fixing member 56*a*, like for example a screw or a bolt/pin. The locking element 54*a* is arranged on the inner side 46*a* of the door unit 22*a*. Preferably the locking element 54*a* is attached below the third bearing element 44*a*.

The locking unit 52*a* comprises a holding element 58*a*. For a locking the holding element 58*a* is configured to be connected to the locking element 54*a* in a force-fit and/or form-fit manner. The holding element 58a is mounted at the second bearing element 34a. The holding element 58a is in particular arranged on an underside of the second bearing element 34a. Preferably the holding element 58a is implemented integrally with the second bearing element 34a. The holding element 58a forms a holding contour 60a. The holding contour 60a is realized correspondingly to the locking element 54a. The holding contour 60a is preferably realized as a deepening. The holding contour 60a is in particular realized as a circle-shaped deepening. The holding contour 60a forms a support region 62a in a first direction. The support region 62a is configured such that a force can be supported thereon in a normal operation state. The support region 62a cannot be over-pressurized by the locking element 54a. In a second direction the holding contour 60a has a release region 64a. The release region 64a is configured such that it can be over-pressurized by the locking element 54a at a defined force, thus in particular undoing a locking between the holding contour 60a and the locking element 54a. For an uncoupling the locking element 54a is configured to be elastically deformed. As a result of the elastic deformation of the locking element 54a by an acting force, the locking element 54a can be removed out of the holding contour 60a, thus unlocking the locking unit 52a. The locking unit 52a is configured to be brought back into its locking position after an unlocking. For this purpose, the locking element 54a may be pressed back into the holding contour 60a.

In an operation state that differs from a normal operation state, in which the support via the first and second bearing elements 30a, 34a is not possible, the door unit 22a can be axially displaced, in particular brought into a closed position, by means of the second and third bearing elements 34a, 44a. By the third bearing element 44a, in particular a redundancy is created which enables an opening of the door unit 22a even in the case of a defective support via the first and second bearing elements 30a, 34a. This in particular permits an increase of safety and comfort as the bearing device 24a is implemented in a less fault-prone manner. By way of example, in FIGS. 5 and 6 a blocking of the second bearing element 34a in the first bearing element 30a is illustrated. The blocking is here exemplarily shown to be caused by a pin that blocks the second bearing element 34a in the first bearing element 30a and in particular prevents a displacement of the door unit 22a into its open position. Basically such a blocking may be brought about by dirt in the bearing module 26a or by a damage of the first bearing element 30a or of the second bearing element 34a. The second bearing element 34a is fixedly connected with the first bearing element 30a. If an opening force is exerted onto the door unit 22a in the opening direction of the door unit 22a, for example by a passenger or staff member exerting a pressure, the locking element 54a is deformed elastically and is in particular pushed over the release region 64a of the holding contour 60a (see FIG. 5). As a result, the locking unit 52a is unlocked and a positionally fixed coupling between the second bearing element 34a and the third bearing element 44a is undone. As a result, the second bearing element 34a is axially movable relative to the third bearing element 44a. The door unit 22a, which is fixedly connected with the third bearing element 44a, is axially displaceable via the third bearing element 44a and the second bearing element 34a and can thus be brought into the open position. The door unit 22a is herein in particular adjusted along the third bearing element 44a that is embodied as a secondary guiding rail.

The second bearing module 28a is realized essentially similarly to the first bearing module 26a. In particular, a functionality of the second bearing module 28a is essentially the same as the functionality of the first bearing module 26a. The second bearing module 28a preferably comprises substantially the same components as the first bearing module 26a. The difference between the first bearing module 26a and the second bearing module 28a is essentially that an arrangement of a primary guiding rail and a secondary guiding rail has been swapped in contrast to the first bearing module 26a. In particular, in the second bearing module 28a a primary guiding rail is fixed at the door unit 22a and a secondary guiding rail is fixed at the enclosure element 16a. In the following the second bearing module 28a will be described briefly.

The second bearing module 28a comprises a first bearing element 66a. The first bearing element 66a is embodied as a guiding rail, in particular as a primary guiding rail. The first bearing element 66a forms a guiding contour, which preferably has an undercut. The first bearing element 66a is fixedly connected with the door unit 22a. The first bearing element 66a is connected on an inner side 46a of the door unit 22a.

The second bearing module 28a comprises a second bearing element 68a. The second bearing element 68a is realized as an intermediate element. Preferably the second bearing element 68a is in particular embodied as a bearing carriage. The second bearing element 68a has a base body 70a. The base body 70a has a longitudinal extension. The base body 70a forms a first connection region 72a. The first connection region 72a is configured for a connection of the first bearing element 66a. The base body 70a comprises a second connection region 74a. The second connection region 74a is in particular configured to connect a further element, preferably in particular a further bearing element. The two connection regions 72a, 74a respectively extend in a horizontal direction. The connection regions 72a, 74a are arranged spaced apart from each other in a transverse direction. The two connection regions 72a, 74a are connected to each other by a middle region 76a. The two connection regions 72a, 74a and the middle region 76a together form the base body 70a, preferably in one piece.

The second bearing module 28a comprises a third bearing element 78a. The third bearing element 78a is embodied as a guiding rail. The third bearing element 78a is in particular embodied as a secondary guiding rail. The third bearing element 78a that is embodied as a guiding rail has a longitudinal main extension. The third bearing element 78a forms a guiding contour, which preferably has an undercut. The third bearing element 78a is fixedly connected with the enclosure unit 14a, in particular the enclosure element 16a. The third bearing element 78a is connected on an inner side 32a of the enclosure element 16a.

The second bearing element 68a is movably connected with the first bearing element 66a. The second bearing element 68a is in particular supported such that it is linearly displaceable relative to the first bearing element 66a along the bearing path of the first bearing element 66a. The second bearing element 68a comprises several swivel bearings 80a, via which the second bearing element 68a is supported such that it is displaceable relative to the first bearing element 66a. The swivel bearings 80a are in particular connected at the first connection region 72a of the base body 70a. The swivel bearings 80a are in particular arranged in the guiding contour of the first bearing element 66a. In a normal operation state, the bearing module 28a is configured to support the door unit 22a movably via the first bearing element 66a and the second bearing element 68a. In the normal operation state an adjustment between the closed and the open position of the door unit 22a is brought about by a relative movement of the second bearing element 68a and the first bearing element 66a.

The second bearing element 68a is movably connected with the third bearing element 78a. The second bearing element 68a is in particular supported such that it is linearly displaceable relative to the third bearing element 78a along the bearing path of the third bearing element 78a. The second bearing element 68a comprises several swivel bearings 82a, via which the second bearing element 68a is supported displaceably relative to the third bearing element 78a. The swivel bearings 82a are implemented as roller elements which are fixed rotatably on the base body 36a of the second bearing element 34a. The swivel bearings 82a are in particular connected at the second connection region 72a of the base body 70a. The second connection region 72a is configured for a connection of the third bearing element 78a.

In an operation state that differs from a normal operation state, the third bearing element 78a is configured for a movable support of the second bearing element 68a. In the operation state that differs from a normal operation state, the bearing module 28a is configured for a movable support of the door unit 22a via the third bearing element 78a and the second bearing element 68a. The second bearing element 68a is configured, in a normal operation state, to be fixed to the third bearing element 78a in a positionally secure manner. The second bearing element 68a is in particular configured, in a normal operation state, to be fixed on the enclosure element 16a of the enclosure unit 14a in a positionally secure manner. By the fixing of the second bearing element 68a to the third bearing element 78a, a relative movement of the second bearing element 68a with respect to the third bearing element 78a is prevented. By the fixing of the second bearing element 68a to the third bearing element 78a, in particular a displacement of the door unit 22a via the second bearing element 68a and the third bearing element 78a is prevented.

For the purpose of fixing the second bearing element 68a to the third bearing element 78a, the bearing module 28a comprises a locking unit 84a. The locking unit 84a is configured, in a normal operation state, to couple the second bearing element 68a with the third bearing element 78a in a positionally fixed manner. The locking unit 84a is configured for a force-fit and form-fit locking of the second bearing element 68a in a locking state. For a locking of the second bearing element 68a the locking unit 84a comprises a locking element 86a that is fixedly connected with the enclosure element 16a. The locking element 86a is configured to uncouple the locking unit 84a at a defined force. The locking unit 84a comprises a holding element 88a. For a locking, the holding element 88a is configured to be connected to the locking element 86a in a force-fit and/or form-fit manner. The holding element 88a is attached at the second bearing element 68a. Preferably the holding element 88a is realized integrally with the second bearing element 68a. The holding element 88a forms a holding contour 90a. The holding contour 90a is realized correspondingly to the locking element 86a. The holding contour 90a is preferably realized as a deepening.

In an operation state that differs from a normal operation state, in which the support via the first and second bearing elements 66a, 68a is not possible, a function of the second bearing module 28a is implemented analogously to the function of the first bearing module 26a and shall therefore not be described here in detail. Principally it would also be conceivable that instead of the second bearing module 28a the bearing device 24a merely has a simple guiding of the door unit 22a in the lower region of the enclosure element 16a. It would principally also be conceivable that the first bearing module 26a is implemented identically to the second bearing module 28a. It would principally also be conceivable that the second bearing module 28a is implemented identically to the first bearing module 26a.

In FIGS. 9 to 16 four further exemplary embodiments of the invention are illustrated. The following descriptions and the drawings are essentially limited to the differences between the exemplary embodiments, wherein regarding components having the same denomination, in particular regarding components having the same reference numerals, principally the drawings and/or the description of the other exemplary embodiments, in particular of FIGS. 1 to 8, may be referred to. In order to distinguish between the exemplary embodiments, the letter a has been added to the reference numerals of the exemplary embodiment in FIGS. 1 to 8. In the exemplary embodiments of FIGS. 9 to 16, the letter a has been substituted by the letters b to e.

In FIGS. 9 to 11 a second exemplary embodiment of the aircraft seat module is illustrated. The aircraft seat module is embodied as part of the interior fittings of an aircraft cabin. Preferably several aircraft seat modules are arranged in an aircraft cabin. The aircraft seat module forms a flight passenger seating region. The flight passenger seating region is implemented as a region which is in particular available to a passenger for himself during a flight. The aircraft seat module comprises an enclosure unit 14b. The enclosure unit 14b is configured to at least partially separate the flight passenger seating region from a remainder of the aircraft cabin. The enclosure unit 14b comprises an enclosure element 16b. The enclosure element 16b surrounds the flight passenger seating region at least partially. The aircraft seat module comprises a door unit 22b. The door unit 22b is configured, in at least one operation state, to at least partially delimit the flight passenger seating region against an adjoining cabin region, in particular an aisle region. The door unit 22b is configured to close a passage region in a closed state.

For a support of the door unit 22b, the aircraft seat module comprises a bearing device 24b. The bearing device 24b is configured to support the door unit 22b movably on the enclosure unit 14b. The door unit 22b is connected to the enclosure element 16b via the bearing device 24b. The door unit 22b is adjustable between its open state and its closed state by means of the bearing device 24b. The bearing device 24b is preferably embodied as a linear bearing device. The door unit 22b is linearly displaceable between a closed position and an open position by means of the bearing device 24b that is embodied as a linear bearing device.

The bearing device 24b comprises a bearing module 26b. The bearing module 26b comprises two first bearing elements 30b, 30'b. The bearing elements 30b, 30'b are in each case embodied as a guiding rail, in particular as a primary guiding rail. The first bearing elements 30b, 30'b in each case form a guiding contour, which preferably has an undercut. The first bearing elements 30b, 30'b which are embodied as guiding rails have a longitudinal main extent. The first bearing elements 30b, 30'b form a bearing path along which elements can be supported such that they are movable, in particular axially displaceable, relative to the bearing elements 30b, 30'b. The first bearing elements 30b, 30'b are fixedly connected with the enclosure unit 14b. The first bearing elements 30b, 30'b are in particular fixedly connected with the enclosure element 16b. The first bearing element 30b of the first bearing elements 30b, 30'b is connected on an inner side 32b of the enclosure element 16b. The one bearing element 30b is in particular arranged in an upper region of the enclosure element 16b. The other first bearing element 30'b is arranged in a lower region of the enclosure element 16b.

The first bearing module 26b comprises a second bearing element 34b. The second bearing element 34b is embodied as an intermediate element. The second bearing element 34b is embodied as a bearing carriage. The second bearing element 34b is embodied as a frame element. The second bearing element 34b is configured to at least partially engage around the door unit 22b, at least in a subregion. The second bearing element 34b has a height extent that is larger than a height extent of the door unit 22b. The second bearing element 34b engages around the door unit 22b at an upper end and at a lower end.

The bearing module 26b comprises two third bearing elements 44b, 44b'. The third bearing elements 44b, 44b' are embodied as guiding rails. The third bearing elements 44b, 44b' are in particular embodied as secondary guiding rails. The third bearing elements 44b, 44b' which are embodied as guiding rails have a longitudinal main extent. The third bearing elements 44b, 44b' form a guiding contour. The third bearing elements 44b, 44b' are respectively arranged on the underside, respectively on the upper side, of the door unit 22b. The third bearing elements 44b, 44b' are fixedly connected with the door unit 22b. Preferably the third bearing elements 44b, 44b' are realized integrally with the door unit 22b. The one third bearing element 44b is inserted in an upper side of the door unit 22b. The other third bearing element 44b' is inserted in an underside of the door unit 22b. The third bearing elements 44b, 44b' in each case form a bearing path along which elements can be supported movably, in particular axially displaceably, relative to the third bearing element 44b.

The second bearing element 34b is movably connected with the first bearing element 30b. The second bearing element 34b is in particular supported such that it is linearly displaceable relative to the first bearing element 30b along the bearing path of the first bearing element 30b. The second bearing element 34b comprises several swivel bearings 48b, 48'b, via which the second bearing element 34b is supported such that it is displaceable relative to the two first bearing elements 30b, 30'b. The swivel bearings 48b, 48'b are realized as roller elements which are fixed rotatably on the second bearing element 34b. The swivel bearings 48b, 48'b are in particular arranged in the guiding contour of the first bearing elements 30b, 30'b. For a displaceable support of the door unit 22b, the swivel bearings 48b, 48'b are configured to roll in the guiding contours of the first bearing elements 30b, 30'b. In a normal operation state, the bearing module 26b is configured to support the door unit 22b movably via the first bearing element 30b and the second bearing element 34b. The door unit 22b is in the normal operation state connected with the second bearing element 34b in a positionally fixed manner. In the normal operation state, the door unit 22b is displaced together with the second bearing element 34b relative to the first bearing elements 30b, 30'b and is thus displaced between its closed position and its open position.

The second bearing element 34b is movably connected with the third bearing elements 44b, 44'b. The second bearing element 34b is in particular supported such that it is linearly displaceable relative to the third bearing elements 44b, 44'b, in particular to the door unit 22b, along the bearing paths of the third bearing elements 44b, 44'b. The second bearing element 34b is coupled with the door unit 22b such that it is displaceable via the third bearing elements 44b, 44'b, which are fixedly connected with the door unit 22b or are formed by the door unit 22b. The second bearing element 34b comprises two guiding elements 92b, 94b. The guiding elements 92b, 94b are configured to engage into the two third bearing elements 44b, 44'b. The guiding elements 92b, 94b are respectively arranged in an upper, respectively lower, region of the second bearing element 34b, in which the second bearing element 34b engages around the door unit 22b. The guiding elements 92b, 94b are in each case attached on an inner side of the second bearing element 34b and extend inwards. In a mounted state the guiding elements 92b, 94b respectively protrude into the adjoining third bearing element 44b, 44'b. The guiding elements 92b, 94b are supported in the respective third bearing element 44b, 44'b via a slide bearing. The second bearing element 34b is configured, in a normal operation state, to be fixed at the third bearing elements 44b, 44'b in a positionally secure manner. By the fixation of the second bearing element 34b to the third bearing elements 44b, 44'b, a relative movement of the second bearing element 34b with respect to the third bearing elements 44b, 44'b, i. e. in particular to the door unit 22b, is prevented. By the fixation of the second bearing element 34b to the third bearing elements 44b, 44'b, in particular a displacement of the door unit 22b via the second bearing element 34b and the third bearing elements 44b, 44'b is prevented. Due to the fixation of the second bearing element 34b to the third bearing elements 44b, 44'b, a movable support of the door unit 22b is realized merely by the first bearing element 30b and the second bearing element 34b. Principally it would also be conceivable that the third bearing elements 44b, 44'b are inserted in a rear side of the door unit 22b. It is as well conceivable that the guiding elements 92b, 94b comprise several rotatably supported roller elements which are arranged displaceably in the third bearing elements 44b, 44'b.

For fixing the second bearing element 34b to the third bearing element 44b the bearing module 26b comprises a locking unit 52b. The locking unit 52b is in particular embodied as a friction-fit locking unit. The locking unit 52b is configured to lock via friction-fit between the guiding elements 92b, 94b and the bearing elements 44b, 44'b. Up to a defined transverse force between the guiding elements 92b, 94b and the bearing elements 44b, 44'b the locking unit 52b is locked. At a defined transverse force, referred to as an overload, the stiction between the guiding elements 92b, 94b and the bearing elements 44b, 44'b is overcome and the guiding elements 92b, 94b can be displaced axially in the bearing elements 44b, 44'b. In this way the door unit 22b is axially displaceable with respect to the second bearing element 34b. It is principally also conceivable that the locking unit 52b is realized equivalently to the locking unit of the first exemplary embodiment.

In FIG. 12 a third exemplary embodiment of the aircraft seat module is illustrated. The aircraft seat module is implemented as part of the interior fittings of an aircraft cabin. The aircraft seat module comprises an enclosure unit 14c. The enclosure unit 14c is configured to separate the flight passenger seating region at least partially from the remainder of the aircraft cabin. The enclosure unit 14c comprises an enclosure element 16c. The aircraft seat module comprises a door unit 22c. The door unit 22c is configured, in at least one operation state, to delimit the flight passenger seating region at least partially from an adjoining cabin region, in particular an aisle region.

For the support of the door unit 22c the aircraft seat module comprises a bearing device 24c. The bearing device 24c is configured to support the door unit 22c movably on the enclosure unit 14c. The bearing device 24c comprises a first bearing module 26c. The first bearing module 26c comprises a first bearing element 30c. The first bearing element 30c is embodied as a guiding rail, in particular as a primary guiding rail. The first bearing element 30c that is embodied as a guiding rail is connected with the enclosure element 16c. The first bearing module 26c comprises a second bearing element 34c. The second bearing element 34c is implemented as an intermediate element. The first bearing module 26c comprises a third bearing element 44c. The third bearing element 44c is embodied as a guiding rail. The third bearing element 44c is in particular embodied as a secondary guiding rail. The third bearing element 44c is connected with the door unit 22c. The first bearing module 26c is realized essentially like the first bearing module of the first exemplary embodiment. In contrast to the first exemplary embodiment, the door unit 22c is here driven, in particular adjustable, electrically. For the electrical adjustment of the door unit 22c, the bearing device 24c comprises an electromotor 98c. The electromotor 98c is integrated in the first bearing module 26c. The electromotor 26c is connected to the second bearing element 34c which is implemented as an intermediate element. The bearing device 24c comprises a toothed-wheel element 100c, which is drivable by the electromotor 98c. The toothed-wheel element 100c is coupled in a rotationally fixed manner with the electromotor 98c via a shaft. Differently than in the first exemplary embodiment, the first bearing element 30c comprises a toothed bar 102c. The toothed-wheel element 100c driven by the electromotor 98c is guided in the toothed bar 102c. The door unit 22c can be opened or closed by operating the electromotor 98c in different rotation directions. The bearing device 24c comprises electronics, which are not shown in detail and are configured for an actuation of the electromotor 98c. Via the electronics, a passenger can actuate the electromotor 98c by means of an operating unit (not shown in detail) and can thus optionally open or close the door unit 22c.

Like the preceding exemplary embodiments, the bearing module 26c comprises a locking unit 52c for fixing the second bearing element 34c to the third bearing element 44c in a normal operation state. The locking unit 52c may herein in particular be realized in the same way as in one of the preceding exemplary embodiments. In an operative situation in which, for example, the electronics fail, the electromotor 98c is defective or the toothed-wheel element 100c is jammed in the toothed bar 102c, the door unit 22c is no longer adjustable by means of the electromotor 98c via the first and second bearing elements 30c, 34c. By an unlocking of the locking unit 52c it is possible, like in the preceding exemplary embodiments, that in the operation state which differs from the normal operation state, the door unit 22c is adjusted, i. e. displaced via the second bearing element 34c and the third bearing element 44c, i. e. between the closed position and the open position.

In FIG. 13 a fourth exemplary embodiment of the aircraft seat module is shown. The aircraft seat module is realized as part of the interior fittings of an aircraft cabin. The aircraft seat module comprises an enclosure unit. The enclosure unit 14d comprises an enclosure element 16d. The aircraft seat module comprises a door unit 22d. The door unit 22d is configured, in at least one operation state, to delimit the flight passenger seating region at least partially from an adjoining cabin region, in particular an aisle region.

The aircraft seat module comprises a bearing device 24d for a support of the door unit 22d. The bearing device 24d is configured to support the door unit 22d movably on the enclosure unit. The bearing device 24d comprises a first bearing module 26d. The first bearing module 26d comprises a first bearing element 30d. The first bearing element 30d is embodied as a guiding rail, in particular as a primary guiding rail. Differently than in the third exemplary embodiment of FIG. 12, the first bearing element 30d which is embodied as a guiding rail is connected to the door unit 22d. The first bearing module 26d comprises a second bearing element 34d. The second bearing element 34d is embodied as an intermediate element. The first bearing module 26d comprises a third bearing element. The third bearing element 44d is embodied as a guiding rail. The third bearing element is in particular embodied as a secondary guiding rail. The third bearing element is connected to the enclosure element.

For an electrical adjustment of the door unit 22c, the bearing device 24d comprises an electromotor 98d. The electromotor 98d is integrated in the first bearing module 26d. The electromotor 98d is connected to the second bearing element 34d that is embodied as an intermediate element. The bearing device 24d comprises a toothed-wheel element 100d, which is drivable by the electromotor 98d. In contrast to the first exemplary embodiment, the first bearing element 30d comprises a toothed bar 102d. In contrast to the third exemplary embodiment, the toothed bar 102d is attached on the bearing element 30d that is connected to the door unit 22d. The toothed-wheel element 100d that is driven by the electromotor 98d is guided in the toothed bar 102d. A basic functionality of the bearing device 24d corresponds to the functionality of the third exemplary embodiment of FIG. 12.

In FIGS. 14 to 16 a fifth exemplary embodiment of the aircraft seat module is illustrated. The aircraft seat module is realized as part of the interior fittings of an aircraft cabin. The aircraft seat module forms a flight passenger seating region 10e. The aircraft seat module comprises an enclosure unit 14e. The enclosure unit 14e comprises an enclosure element 16e. The enclosure unit 14e forms a passage region 18e. The passage region 18e connects the flight passenger seating region 10e and the adjoining aisle region 20e of the aircraft cabin. The aircraft seat module comprises a door unit 22e. The door unit 22e is configured, in at least one operation state, to delimit the flight passenger seating region 10e at least partially from an adjoining cabin region, in particular an aisle region. The door unit 22e and the enclosure unit 14e may preferably be realized in the same way as in the preceding exemplary embodiments.

For the support of the door unit 22e the aircraft seat module comprises a bearing device 24e. The bearing device 24e is configured to support the door unit 22e movably on the enclosure unit 14e. The door unit 22e is connected to the enclosure element 16e via the bearing device 24e. The door unit 22e is adjustable between its open state and its closed state by means of the bearing device 14e. The bearing device 24e is preferably implemented as a linear bearing device. The door unit 22e is linearly displaceable between a closed position and an open position by means of the bearing device 24e that is embodied as a linear bearing device. The bearing device 24e comprises a first bearing module, which is not shown in detail. The first bearing module is configured to support the door unit 22e in an upper region. The first bearing module for supporting the door unit 22e in an upper region may preferably be realized equivalently to one of the preceding exemplary embodiments of FIGS. 1 to 13.

The bearing device 24e comprises a second bearing module 28e. The second bearing module 28e is configured to support the door unit 22e in a lower region. The second bearing module 28e is arranged in a lower region of the door unit 22e. An especially even support of the door unit 22e is achievable by the upper bearing module and the lower bearing module 28e, which are arranged on two opposite regions of the door unit 22e. Differently than in the preceding exemplary embodiments, the second bearing module 28e is preferably implemented essentially differently than the first bearing module of the bearing device 24e. The second bearing module 28e is configured, in a normal operation state, to support the door unit 22e in a guided manner relative to the enclosure element 16e. In a normal operation state, the door unit 22e is supported in its lower region by the second bearing module 28e in such a way that it is displaceable relative to the enclosure element 16a.

The second bearing module 28e comprises a first bearing element 66e. The first bearing element 66e is embodied as a guiding rail, in particular as a primary guiding rail. The first bearing element 66e forms a guiding contour, which preferably has an undercut. The first bearing element 66e that is embodied as a guiding rail has a longitudinal main extent. The first bearing element 66e forms a bearing path along which elements can be supported movably, in particular axially displaceably, relative to the bearing element 66e. The first bearing element 66e is fixedly connected with the door unit 22e. The first bearing element 66e is in particular fixedly connected with an inner side of the door unit 22e. Preferably the first bearing element 66e is fixedly connected with the door unit 22e by means of screw connections. It is principally also conceivable that the first bearing element 66e is connected with the door unit 22e in a fix and positionally secure manner, for example via a glue connection or clip connection. The first bearing element 66e of the second bearing module 28e is arranged in a lower region of the door unit 22e. The first bearing element 66e is preferably arranged in a region of the door unit 22e that faces toward a cabin floor.

The second bearing module 28e comprises a second bearing element 68e. The second bearing element 68e is embodied as an intermediate element. Preferably the second bearing element 68e is in particular embodied as a bearing carriage. The second bearing element 68e has a base body 70e. The base body 70e has a longitudinal extent. The base body 70e is preferably realized in a plate shape. The base body 70e of the second bearing element 68e is preferably realized as a flat bar. In a mounted state the second bearing element 68e faces toward the first bearing element 66e with a flat side. The side of the base body 70e that faces toward the first bearing element 66e is implemented as a connection region 72e. The second bearing element 68e is movably connected with the first bearing element 66e. The second bearing element 68e is in particular supported such that it is linearly displaceable relative to the first bearing element 66e along the bearing path of the first bearing element 66e. The second bearing element 68e comprises several swivel bearings 80e, via which the second bearing element 68e is supported displaceably relative to the first bearing element 66e. The swivel bearings 80e are preferably connected to the first connection region 72e of the base body 70e. The swivel bearings 80e are preferably fixed to the second bearing element 68e by screw connections via through holes introduced in the base body 70e of the second bearing element 68e. The swivel bearings 80e are preferably arranged in the guiding contour of the first bearing element 66e. In a normal operation state the bearing module 28e is configured to support the door unit 22e in its lower region such that it is movable via the first bearing element 66e and the second bearing element 68e. In the normal operation state an adjustment between the closed position and the open position of the door unit 22e is brought about by a relative movement of the second bearing element 68e and the first bearing element 66e.

The second bearing module 28e comprises a connection element 104e. The connection element 104e is configured for a connection of the second bearing element 68e. The connection element 104e is configured to connect the second bearing element 68e to the enclosure unit 14e in a normal operation state. Preferably the connection element 104e is configured to connect the second bearing element 68e to the enclosure element 16e in a normal operation state. The second bearing element 68e can be coupled in a positionally fixed manner with the enclosure element 16e by means of the connection element 104e. The connection element 104e is fixedly connected with the enclosure element 16e. Preferably the connection element 104e is fixedly connected with the enclosure element 16e by means of a screw connection. It is principally also conceivable that the connection element 104e is connected with the enclosure element 16e in a positionally fixed manner by a different connection method, for example by a glue connection. It is principally as well conceivable that the connection element 104e is realized integrally with the enclosure element 16e. The connection element 104e is attached on an outer side of the enclosure element 16e. The connection element 104e is connected in a lower region of the enclosure element 16e. In a normal operation state the second bearing element 68e is coupled with the connection element 104e in a positionally fixed manner. In the normal operation state the second bearing element 68a is coupled with the enclosure element 16e in a positionally fixed manner. In an operation state that differs from the normal operation state, the second bearing element 68e is configured to be uncoupled from the connection element 104e. In an operation state that differs from the normal operation state, the second bearing element 68e is separate from the connection element 104e. In the operation state that differs from the normal operation state, the connection element 104e which is connected with the enclosure element 16e is cantilevered with respect to the second bearing element 68e that is coupled with the first bearing element 66e. In the operation state that differs from the normal operation state, the door unit 22e is with its lower end in a cantilever-like state with respect to the second bearing element 68e and thus to the enclosure element 16e. In the operation state that differs from the normal operation state, the door unit 22e is with its lower end released from the second bearing element 68e and thus from the enclosure element 16e. In the operation state that differs from the normal operation state, the door unit 22e is able to move with its lower end in a defined movement range with respect to the second bearing element 68e and thus to the enclosure element 16e. In the operation state that differs from the normal operation state, the door unit 22e is movable, i. e. axially displaceable, independently from functionality of a support, between the first bearing element 66e and the second bearing element 68e of the second bearing module 28e with respect to the enclosure element 16e. Preferably the second bearing module 28e comprises a catch element, which is configured to delimit a pivoting of the door unit 22e in the lower region. The catch element may, for example, be realized as a catch cage securing the lower end of the door unit 22e after uncoupling at the enclosure element 16e after uncoupling so as to prevent an excess pivoting, for example into an aisle region.

For the connection of the second bearing element 68e the connection element 104e comprises a connection region 106e. The second bearing element 68e can be coupled with the connection element 104e via the connection region 106e. The connection region 106e is embodied as a guiding rail. Preferably the connection region 106e is embodied as a slide rail. The second bearing element 68e is configured to be supported in the connection region 106e of the connection element 104e. The connection region 106e that is embodied as a slide rail is integrally formed by the connection element 104e. The connection region 106e is realized as a recess in the connection element 104e. The connection region 106e is realized as a recess that is in a mounted state open towards the first bearing element 66e. The connection region 106e forms on its axial side walls respectively one undercut, in which the second bearing element 68e is supported, gliding therein with corresponding bearing projections. The connection region 106e extends in an axial direction of the connection element 104e from a first end of the connection element 104e as far as an opposite-situated second end.

For a positionally secure fixing of the second bearing element 68e on the connection element 104e, the bearing module 28e comprises a locking unit 108e. The locking unit 108e is configured, in a normal operation state, to couple the second bearing element 68e with the connection element 104e in a positionally fixed manner. The locking unit 108e is configured for a force-fit and form-fit locking of the second bearing element 68e in a locking state. The locking unit 108e is configured, in a locking state, for a force-fit and form-fit coupling of the second bearing element 68e with the connection element 104e. Preferably the locking unit 108e is configured to connect the second bearing element 68e in a force-fit and/or force-fit manner with the element which the connection element 104e is connected to, i. e. in particular with the door unit 22e.

For a locking of the second bearing element 68e, the locking unit 108e comprises a locking element 110e, which is fixedly connected with the second bearing element 68e. The locking element 110e is configured to uncouple the locking unit 108e at a defined force. The locking element 110e is configured to be at least partially deformed elastically.

The locking element 110e is in particular made of an elastic synthetic material. The locking element 110e preferably has a round shape. The locking element 110e is preferably embodied in a ring shape. The locking element 110e is fixedly connected with the second bearing element 68e via a fixing member, like for example a screw or a bolt/pin. The locking element 110e is connected at a first end of the second bearing element 68e.

The locking unit 108e comprises a holding element 112e. For a locking the holding element 112e is configured for a force-fit and/or form-fit connection to the locking element 110e. The holding element 112e is attached to the connection element 104e. The holding element 112e is preferably realized by the connection element 104e. The holding element 112e forms a holding contour. The holding contour is realized so as to correspond to the locking element 110e. The holding contour is preferably formed by deepenings in side walls of the connection region that is embodied as a slide rail. The holding element 112e is integrated in the connection region 106e at a first end of the connection element 104e. The holding element 112e is realized as a circle-shaped holding contour. The holding element 112e is realized as a circle-shaped contour in a plane of the connection region 106e that has a diameter greater than a width of the connection region. In a normal operation state the locking element 110e is arranged in the holding element 112e in a form-fit fashion. For an uncoupling the locking element 110e is configured to be deformed elastically. As a result of the elastic deformation of the locking element 110e by an acting force, the locking element 110e can be removed out of the holding contour of the holding element 112e, thus unlocking the locking unit 108e. The locking unit 108e is configured, after an unlocking, to be brought back into its locking position. For this purpose, the locking element 110e can be pressed back into the holding contour of the holding element 112e.

In the normal operation state the second bearing element 68e is fixed on the connection element 104e in a positionally fixed manner. An adjustment of the door unit 22e between the open state and the closed state is brought about by an axial movement between the first bearing element 66e and the second bearing element 68e via the swivel bearings 80e. In an operation state that differs from a normal operation state, in which the support via the first and second bearing elements 66e, 68e is not possible, the door unit 22e can in its lower region be uncoupled from the connection element 104e, i. e. from the enclosure element 16e, and can thus be brought into a closed position at the lower region in a cantilevered fashion. By the possible uncoupling of the first bearing element 66e, which is attached to the door unit 22e, from the connection element 104e of the lower second bearing module 28e, which is attached to the enclosure element 16e, an opening of the door unit 22e is enabled even in the case of a defective support via the first and second bearing elements 66e, 68e of the second bearing module 28e. This in particular allows an increase of safety and comfort as the bearing device 24e is realized in a less fault-prone manner. By way of example, a blocking of the second bearing element 68e in the first bearing element 66e is shown here in FIG. 16. The blocking is here exemplarily shown by a pin 114e that blocks the second bearing element 68e in the first bearing element 66e, thus in particular preventing a displacement of the door unit 22e into its open position. In FIG. 16 the locking unit 108e is shown in an already uncoupled state, in which the second bearing element 68e is separate from the connection element 104e. The door unit 22e is already connected in an arrow direction 116e to the enclosure element 16e and to the connection element 104e that is fixed thereto in a positionally fixed manner. Principally such a blocking may also be caused by dirt or by a damaging of the first bearing element 66e, of the swivel bearings 80e or of the second bearing element 68e. The second bearing element 68e is fixedly connected with the first bearing element 66e. If an opening force is exerted onto the door unit 22e in an opening direction of the door unit 22e, for example by a passenger or a staff member pressing onto the door unit 22e, the locking element 110e is elastically deformed out of the holding contour of the holding element 112e. As a result, the locking unit 108e is unlocked and a positionally fixed coupling between the second bearing element 68e and the connection element 104e is undone. As a result, the connection element 104e can be separated from the second bearing element 68e and is now arranged in a cantilevered fashion with respect to said second bearing element 68e. After an uncoupling the first bearing element 66e and the door unit 22e that is coupled thereto are axially movable with respect to the connection element 104e and the enclosure element 16e. The door unit 22e, which is fixedly connected with the first bearing element 66e, is cantilevered at its lower end and can be displaced axially and can thus be brought into the open position. The door unit 22e is herein in particular guided along a bearing element realized by the upper first bearing module that is not shown in detail. After an uncoupling of the second bearing element 68e from the connection element 104e of the second bearing module 68e, the door unit 22e is in its lower region no longer coupled with the enclosure element 16e. In a state after an uncoupling, a support of the door unit 22e is brought about exclusively via the upper first bearing module of the bearing device 24e. An uncoupling of the door unit 22e at the lower bearing module 28e is possible as, in the operation state that differs from the normal operation state, a functionally secure support is also provided merely by the upper first bearing module 26e. The implementation of the lower second bearing module 28e in the above-described manner is in particular advantageous as it can be realized in a space-saving fashion because a second bearing element that is embodied as a support rail may preferably be dispensed with. Therefore the solution for the second bearing module 28e described in the present exemplary embodiment is advantageous in particular for bearing modules 28e which are connected at the lower end of the door unit 22e. It is however principally conceivable that such a bearing module is also realized as an upper bearing module. In such a case it would be necessary to provide a catch element with a corresponding emergency running rail, via which the door unit 22e, after an uncoupling from the upper first guiding rail, could be supported displaceably and could be brought into the open position.

Principally it is of course also conceivable that the second bearing module 28e is implemented in such a way that the first bearing element 66e that is embodied as a guiding rail is fixedly connected with the enclosure element 16e and the connection element 104e is fixedly connected with the door unit. With the exception of respective connections, a function and implementation of the components of the bearing module would in this case be equivalent to the implementation described above.

The invention claimed is:

1. An aircraft seat module with an enclosure unit which delimits a flight passenger seating region at least partially, and with a door unit which is at least configured to close a passage region to the flight passenger seating region in at least one operation state, and with a bearing device which is configured to support the door unit movably relative to the enclosure unit and has for this purpose a bearing module comprising a first bearing element and a second bearing element which are supported such that they are movable relative to each other, wherein the bearing module comprises a third bearing element which is configured, in an operation state that differs from a normal operation state, to support the second bearing element movably, the third bearing element being configured for the movable support of the door unit in the operation state that differs from the normal operation state,
wherein in the operation state that differs from the normal operation state, adjustment of the door unit between a first position and a second position different from the first position by relative movement of the first bearing element and the second bearing element is impaired.

2. The aircraft seat module according to claim 1, wherein the second bearing element is configured, in the normal operation state, to be fixed at the third bearing element in a positionally secure fashion.

3. The aircraft seat module according to claim 2, wherein the first bearing element is embodied as a guiding rail which is fixedly connected with the enclosure unit or with the door unit.

4. The aircraft seat module according to claim 3, wherein the third bearing element is realized as a guiding rail, which is fixedly connected with the other enclosure unit or door unit.

5. The aircraft seat module according to claim 1, wherein the second bearing element is embodied as an intermediate bearing element arranged between the first bearing element and the third bearing element.

6. The aircraft seat module according to claim 1, wherein the second bearing element is embodied as a bearing carriage, which is supported relative to the first bearing element and the third bearing element via a slide and/or swivel bearing.

7. The aircraft seat module according to claim 1, wherein the bearing module comprises a locking unit, which is configured, in the normal operation state, to couple the second bearing element with the third bearing element in a positionally fixed manner.

8. The aircraft seat module according to claim 7, wherein the locking unit is configured for locking the second bearing element in a force-fit and/or form-fit manner.

9. The aircraft seat module according to claim 7, wherein the locking unit comprises a locking element which is fixedly connected with the enclosure unit or with the door unit, and which is configured to uncouple the locking unit at a defined force.

10. The aircraft seat module according to claim 9, wherein for an uncoupling the locking element is configured to be at least partially deformed elastically.

11. The aircraft seat module according to claim 9, wherein the locking unit comprises a holding contour, which is configured to hold the locking element in the normal operation state.

12. The aircraft seat module according to claim 7, wherein the locking unit is configured to be brought back into its locking position after an unlocking.

13. The aircraft seat module according to claim 1, wherein the second bearing element engages with the door unit around the door unit at least in a subregion of the door unit.

14. The aircraft seat module according claim 1, wherein a connection element comprises a connection region in which the second bearing element is fixed in a positionally secure manner in the normal operation state.

15. The aircraft seat module according to claim 14, wherein the connection region is realized as a slide rail.

16. The aircraft seat module according to claim 15, wherein in a state after an uncoupling, a support of the door unit is brought about exclusively via the upper, first bearing module of the bearing device.

17. The aircraft seat module according to claim 1, wherein the third bearing element is configured to support the door unit in essentially the same movement range as the first bearing element and the second bearing element.

18. The aircraft seat module according to claim 1, wherein in the normal operation state, the bearing module is configured to support the door unit movably via the first bearing element and the second bearing element, and an adjustment between a closed position and an open position of the door unit is brought about by relative movement of the second bearing element and the first bearing element.

19. An aircraft seat module with an enclosure unit which delimits a flight passenger seating region at least partially, and with a door unit which is at least configured to close a passage region to the flight passenger seating region in at least one operation state, and with a bearing device which is configured to support the door unit movably relative to the enclosure unit and has for this purpose a bearing module comprising a first bearing element and a second bearing element which are supported such that they are movable relative to each other, wherein the bearing module comprises a third bearing element which is configured, in an operation state that differs from a normal operation state, to support the second bearing element movably, the third bearing element being configured for the movable support of the door unit in the operation state that differs from the normal operation state, wherein in the operation state that differs from the normal operation state, the door unit is in a lower region configured in cantilever fashion.

20. An aircraft seat module with an enclosure unit which delimits a flight passenger seating region at least partially, and with a door unit which is at least configured to close a passage region to the flight passenger seating region in at least one operation state, and with a bearing device which is configured to support the door unit movably relative to the enclosure unit and has for this purpose a bearing module comprising a first bearing element and a second bearing element which are supported such that they are movable relative to each other, wherein the bearing module comprises a third bearing element which is configured, in an operation state that differs from a normal operation state, to support the second bearing element movably, the third bearing element being configured for the movable support of the door unit in the operation state that differs from the normal operation state, wherein a second, lower bearing module comprises a connection element for a connection of the second bearing element, the second bearing element being configured to be fixedly coupled with the connection element in the normal operation state and to be uncoupled from the connection element in the operation state that differs from the normal operation state.

\* \* \* \* \*